United States Patent
Gansler et al.

(10) Patent No.: US 10,762,726 B2
(45) Date of Patent: Sep. 1, 2020

(54) HYBRID-ELECTRIC PROPULSION SYSTEM FOR AN AIRCRAFT

(71) Applicant: General Electric Company, Schenectady, NY (US)

(72) Inventors: Michael Thomas Gansler, Mason, OH (US); Sridhar Adibhatla, Glendale, OH (US); Brandon Wayne Miller, Liberty Township, OH (US)

(73) Assignee: General Electric Company, Schenectady, NY (US)

( * ) Notice: Subject to any disclaimer, the term of this patent is extended or adjusted under 35 U.S.C. 154(b) by 164 days.

(21) Appl. No.: 15/621,279

(22) Filed: Jun. 13, 2017

(65) Prior Publication Data

US 2018/0357840 A1    Dec. 13, 2018

(51) Int. Cl.
  *G06F 19/00*    (2018.01)
  *G07C 5/08*    (2006.01)
  (Continued)

(52) U.S. Cl.
  CPC ........... *G07C 5/0808* (2013.01); *B64D 27/02* (2013.01); *B64D 27/10* (2013.01); *B64D 27/24* (2013.01);
  (Continued)

(58) Field of Classification Search
  CPC ...... G07C 5/0808; G07C 5/0841; G07C 5/08; B64D 27/02; B64D 27/10; B64D 27/24;
  (Continued)

(56) References Cited

U.S. PATENT DOCUMENTS

| 2,812,912 A | 11/1957 | Stevens et al. |
| 3,194,516 A | 7/1965 | Messerschmitt |

(Continued)

FOREIGN PATENT DOCUMENTS

| CN | 10557690 A | 5/2016 |
| EP | 2966266 A1 | 1/2016 |

(Continued)

OTHER PUBLICATIONS

U.S. Appl. No. 15/245,257, filed Aug. 24, 2016.
(Continued)

*Primary Examiner* — Ronnie M Mancho
(74) *Attorney, Agent, or Firm* — Dority & Manning, P.A.

(57) ABSTRACT

A computer-implemented method of assessing a health of a gas turbine engine of a hybrid-electric propulsion system for an aircraft includes receiving, by one or more computing devices, data indicative of an amount of electrical power provided to, or extracted from, an electric machine. The method also includes receiving, by the one or more computing devices, data indicative of an operating parameter of the hybrid-electric propulsion system. The method also includes assessing, by the one or more computing devices, a health of the gas turbine engine based at least in part on the received data indicative of the amount of electrical power provided to, or extracted from, the electric machine and the received data indicative of the operating parameter of the hybrid electric propulsion system. The method also includes providing, by the one or more computing devices, information to a user indicative of the health of the gas turbine engine.

20 Claims, 8 Drawing Sheets

(51) Int. Cl.
B64D 27/10 (2006.01)
B64D 27/24 (2006.01)
B64D 35/08 (2006.01)
B64D 27/02 (2006.01)
B64D 43/00 (2006.01)
B64D 45/00 (2006.01)

(52) U.S. Cl.
CPC ........... *B64D 35/08* (2013.01); *G07C 5/0841* (2013.01); *B64D 43/00* (2013.01); *B64D 2027/026* (2013.01); *B64D 2045/0085* (2013.01); *F05D 2220/323* (2013.01); *F05D 2260/80* (2013.01); *G07C 5/08* (2013.01)

(58) Field of Classification Search
CPC .. B64D 35/08; B64D 43/00; B64D 2027/026; B64D 2045/0085; F05D 2220/323; F05D 2260/80
USPC .......................................................... 701/1
See application file for complete search history.

(56) References Cited

U.S. PATENT DOCUMENTS

| | | | |
|---|---|---|---|
| 3,286,470 A | 11/1966 | Gerlaugh | |
| 3,312,448 A | 4/1967 | Hull, Jr. et al. | |
| 3,844,110 A | 10/1974 | Widlansky et al. | |
| 4,089,493 A | 5/1978 | Paulson | |
| 4,370,560 A | 1/1983 | Faulkner et al. | |
| 4,605,185 A | 8/1986 | Reyes | |
| 4,913,380 A | 4/1990 | Verdaman et al. | |
| 5,174,109 A | 12/1992 | Lampe | |
| 5,799,484 A | 9/1998 | Nims | |
| 5,927,644 A | 7/1999 | Ellis et al. | |
| 6,105,697 A | 8/2000 | Weaver | |
| 6,169,332 B1 | 1/2001 | Taylor et al. | |
| 6,545,373 B1 | 4/2003 | Andres et al. | |
| 6,834,831 B2 | 12/2004 | Daggett | |
| 6,976,655 B2 | 12/2005 | Thompson | |
| 6,992,403 B1 | 1/2006 | Raad | |
| 7,251,942 B2 | 8/2007 | Dittmar et al. | |
| 7,267,300 B2 | 9/2007 | Heath et al. | |
| 7,285,871 B2 | 10/2007 | Derouineau | |
| 7,380,749 B2 | 6/2008 | Fucke et al. | |
| 7,387,189 B2 | 6/2008 | James et al. | |
| 7,417,337 B1 | 8/2008 | Suttie | |
| 7,493,754 B2 | 2/2009 | Moniz et al. | |
| 7,495,354 B2 | 2/2009 | Herrmann | |
| 7,514,810 B2 | 4/2009 | Kern et al. | |
| 7,528,499 B2 | 5/2009 | Suttie | |
| 7,665,689 B2 | 2/2010 | McComb | |
| 7,677,502 B2 | 3/2010 | Lawson et al. | |
| 7,752,834 B2 | 7/2010 | Addis | |
| 7,770,377 B2 | 10/2010 | Rolt | |
| 7,806,363 B2 | 10/2010 | Udall et al. | |
| 7,818,969 B1 | 10/2010 | Hotto | |
| 7,819,358 B2 | 10/2010 | Belleville | |
| 7,905,449 B2 | 3/2011 | Cazals et al. | |
| 7,952,244 B2 | 5/2011 | Colin | |
| 7,958,727 B2 | 6/2011 | Arnold | |
| 7,970,497 B2 | 6/2011 | Derouineau et al. | |
| 7,975,465 B2 | 7/2011 | Morris et al. | |
| 7,976,273 B2 | 7/2011 | Suciu et al. | |
| 7,986,052 B2 | 7/2011 | Marconi | |
| 8,016,228 B2 | 9/2011 | Fucke et al. | |
| 8,033,094 B2 | 10/2011 | Suciu et al. | |
| 8,039,983 B2 | 10/2011 | Cote et al. | |
| 8,099,944 B2 | 1/2012 | Foster et al. | |
| 8,109,073 B2 | 2/2012 | Foster et al. | |
| 8,128,019 B2 | 3/2012 | Annati et al. | |
| 8,141,360 B1 | 3/2012 | Huber | |
| 8,162,254 B2 | 4/2012 | Roche | |
| 8,193,761 B1 | 6/2012 | Singh | |
| 8,220,739 B2 | 7/2012 | Cazals | |
| 8,226,040 B2 | 7/2012 | Neto | |
| 8,291,716 B2 | 10/2012 | Foster et al. | |
| 8,317,126 B2 | 11/2012 | Harris et al. | |
| 8,432,048 B1 | 4/2013 | Paulino | |
| 8,469,306 B2 | 6/2013 | Kuhn, Jr. | |
| 8,489,246 B2 | 7/2013 | Dooley | |
| 8,492,920 B2 | 7/2013 | Huang et al. | |
| 8,500,064 B2 | 8/2013 | Bruno et al. | |
| 8,522,522 B2 | 9/2013 | Poisson | |
| 8,549,833 B2 | 10/2013 | Hyde et al. | |
| 8,552,575 B2 | 10/2013 | Teets et al. | |
| 8,568,938 B2 | 10/2013 | Gao et al. | |
| 8,596,036 B2 | 12/2013 | Hyde et al. | |
| 8,631,657 B2 | 1/2014 | Hagen et al. | |
| 8,640,439 B2 | 2/2014 | Hoffjann et al. | |
| 8,657,227 B1 | 2/2014 | Bayliss et al. | |
| 8,672,263 B2 | 3/2014 | Stolte | |
| 8,684,304 B2 | 4/2014 | Burns et al. | |
| 8,692,489 B2 | 4/2014 | Maalioune | |
| 8,723,349 B2 | 5/2014 | Huang et al. | |
| 8,723,385 B2 | 5/2014 | Jia et al. | |
| 8,742,605 B1 | 6/2014 | Wilhide et al. | |
| 8,836,160 B1 | 9/2014 | Paterson et al. | |
| 8,857,191 B2 | 10/2014 | Hyde et al. | |
| 8,890,343 B2 | 11/2014 | Bulin et al. | |
| 8,925,660 B2 | 1/2015 | Bowdich et al. | |
| 8,928,166 B2 | 1/2015 | Seger et al. | |
| 8,939,399 B2 | 1/2015 | Kouros et al. | |
| 8,950,703 B2 | 2/2015 | Bayliss et al. | |
| 8,957,539 B1 | 2/2015 | Ralston | |
| 8,997,493 B2 | 4/2015 | Brust et al. | |
| 8,998,580 B2 | 4/2015 | Quiroz-Hernandez | |
| 9,004,849 B2 | 4/2015 | Munsell et al. | |
| 9,038,398 B2 | 5/2015 | Suciu et al. | |
| 9,045,996 B2 | 6/2015 | Anghel et al. | |
| 9,059,440 B2 | 6/2015 | Hotto | |
| 9,068,562 B1 | 6/2015 | Budica et al. | |
| 9,143,023 B1 | 9/2015 | Uskert | |
| 9,190,892 B2 | 11/2015 | Anthony | |
| 9,376,213 B2 | 6/2016 | Rolt | |
| 987,641 A1 | 1/2018 | Santini et al. | |
| 2006/0037325 A1 | 2/2006 | Peters et al. | |
| 2008/0056892 A1 | 3/2008 | Barton et al. | |
| 2009/0179424 A1 | 7/2009 | Yaron | |
| 2010/0038473 A1 | 2/2010 | Schneider et al. | |
| 2010/0107651 A1* | 5/2010 | Hyde ...................... | F02C 6/00 60/784 |
| 2010/0126178 A1* | 5/2010 | Hyde ..................... | B64D 27/24 60/767 |
| 2011/0016882 A1 | 1/2011 | Woelke et al. | |
| 2012/0119020 A1 | 5/2012 | Burns et al. | |
| 2012/0153076 A1 | 6/2012 | Burns et al. | |
| 2012/0209456 A1 | 8/2012 | Harmon et al. | |
| 2012/0214605 A1 | 8/2012 | Snook et al. | |
| 2013/0032215 A1 | 2/2013 | Streifinger | |
| 2013/0036730 A1 | 2/2013 | Bruno et al. | |
| 2013/0052005 A1 | 2/2013 | Cloft | |
| 2013/0062885 A1 | 3/2013 | Taneja | |
| 2013/0088019 A1 | 4/2013 | Huang et al. | |
| 2013/0099065 A1 | 4/2013 | Stuhlberger | |
| 2013/0139515 A1 | 6/2013 | Schlak | |
| 2013/0154359 A1 | 6/2013 | Huang et al. | |
| 2013/0184958 A1 | 7/2013 | Dyrla et al. | |
| 2013/0227950 A1 | 9/2013 | Anderson et al. | |
| 2013/0251525 A1 | 9/2013 | Saiz | |
| 2013/0306024 A1 | 11/2013 | Rolt | |
| 2014/0010652 A1 | 1/2014 | Suntharalingam et al. | |
| 2014/0060995 A1 | 3/2014 | Anderson et al. | |
| 2014/0084677 A1 | 3/2014 | Haillot | |
| 2014/0151495 A1 | 6/2014 | Kuhn, Jr. | |
| 2014/0156165 A1 | 6/2014 | Ewens et al. | |
| 2014/0245748 A1 | 9/2014 | Anghel et al. | |
| 2014/0250861 A1 | 9/2014 | Eames | |
| 2014/0271114 A1 | 9/2014 | Phillips et al. | |
| 2014/0283519 A1 | 9/2014 | Mariotto et al. | |
| 2014/0290208 A1 | 10/2014 | Rechain et al. | |
| 2014/0338352 A1 | 11/2014 | Edwards et al. | |
| 2014/0339371 A1 | 11/2014 | Yates et al. | |
| 2014/0345281 A1 | 11/2014 | Galbraith | |
| 2014/0346283 A1 | 11/2014 | Salyer | |

(56) References Cited

U.S. PATENT DOCUMENTS

| | | |
|---|---|---|
| 2014/0367510 A1 | 12/2014 | Viala et al. |
| 2014/0367525 A1 | 12/2014 | Salyer |
| 2014/0369810 A1 | 12/2014 | Binks et al. |
| 2015/0005990 A1 | 1/2015 | Burns et al. |
| 2015/0013306 A1 | 1/2015 | Shelley |
| 2015/0014479 A1 | 1/2015 | Bayliss et al. |
| 2015/0028594 A1 | 1/2015 | Mariotto |
| 2015/0084558 A1 | 3/2015 | Benson et al. |
| 2015/0084561 A1 | 3/2015 | Benson et al. |
| 2015/0084565 A1 | 3/2015 | Le Peuvedic |
| 2015/0089921 A1 | 4/2015 | Rideau et al. |
| 2015/0100181 A1 | 4/2015 | Strauss et al. |
| 2015/0104310 A1 | 4/2015 | Griffin |
| 2015/0113996 A1 | 4/2015 | Cai et al. |
| 2015/0115108 A1 | 4/2015 | Benson et al. |
| 2015/0144742 A1 | 5/2015 | Moxon |
| 2015/0148993 A1 | 5/2015 | Anton et al. |
| 2015/0151844 A1 | 6/2015 | Anton et al. |
| 2015/0151847 A1 | 6/2015 | Krug et al. |
| 2015/0159552 A1 | 6/2015 | Rodriguez et al. |
| 2015/0183522 A1 | 7/2015 | Ouellette |
| 2015/0291285 A1 | 10/2015 | Gallet |
| 2015/0380999 A1 | 12/2015 | Joshi et al. |
| 2016/0010589 A1 | 1/2016 | Rolt |
| 2016/0061053 A1 | 3/2016 | Thomassin |
| 2016/0096634 A1 | 4/2016 | Bothier |
| 2016/0207633 A1 | 7/2016 | McWaters et al. |
| 2016/0229549 A1 | 8/2016 | Mitrovic et al. |
| 2016/0236790 A1* | 8/2016 | Knapp ................. B64C 11/001 |
| 2016/0304211 A1 | 10/2016 | Swann |
| 2016/0313197 A1 | 10/2016 | Acharya et al. |
| 2016/0325629 A1 | 11/2016 | Siegel et al. |
| 2016/0332741 A1 | 11/2016 | Moxen |
| 2016/0375994 A1 | 12/2016 | Rossotto |
| 2017/0057650 A1* | 3/2017 | Walter-Robinson ........................ B64D 41/00 |
| 2018/0357840 A1 | 12/2018 | Gansler et al. |

FOREIGN PATENT DOCUMENTS

| | | |
|---|---|---|
| EP | 3093235 A1 | 11/2016 |
| EP | 3095695 A1 | 11/2016 |
| EP | 3415438 A1 | 12/2018 |
| FR | 2952907 A1 | 5/2011 |
| GB | 1024894 A | 4/1966 |
| GB | 2489311 A | 9/2012 |
| GB | 2526611 A | 12/2015 |
| JP | 2012/149578 A | 8/2012 |
| WO | WO2010/020199 A1 | 2/2010 |
| WO | WO2014/072615 A1 | 5/2014 |
| WO | WO2014/123740 A1 | 8/2014 |

OTHER PUBLICATIONS http://aviationweek.com/awin/boeing-researches-alternative-propulsion-and-fuel-options, Aviation Week & Space Technology, Jun. 4, 2012.

Bradley et al., "Subsonic Ultra Green Aircraft Research, Phase II: N+4 Advanced Concept Development," NASA/CR-2012-217556, May 2012.

Simon Schramm, Damping of Torsional Interaction Effects in Power Systems, 2010.

Welstead, Jason R., Felder, James L., Conceptual Design of a Single-Aisle Turboelectric Commercial Transport with Fuselage Boundary Layer Ingestion, NASA, Jan. 2016, pp. 1-34.

Canadian Office Action Corresponding to App No. 3006682 dated Apr. 4, 2019.

European Search Report Corresponding to EP Application No. 181775347 dated Aug. 17, 2018.

Machine Translated Chinese Search Report Corresponding to Application No. 2018106076163 dated May 13, 2020.

* cited by examiner

HYBRID-ELECTRIC PROPULSION SYSTEM FOR AN AIRCRAFT

FIELD

The present subject matter relates generally to a hybrid-electric propulsion system for an aircraft, and more particularly to a method for assessing a health of a gas turbine engine of the hybrid-electric propulsion system.

BACKGROUND

In at least some known engine systems, the engines are designed to operate for relatively long period of time. During this course of operation, the engine may degrade, reducing engine performance and efficiency, and/or increasing engine emissions. Once the engine degrades to a certain point, certain maintenance operations must be performed on the engine to bring it back to a certain operability level. These maintenance operations may include taking the engine off wing and overhauling engine. This process may be time-consuming and expensive. Therefore, it is generally desirable to wait until these maintenance operations are necessary prior to performing such maintenance operations. Accordingly, a system capable of determining an engine health of an engine and/or predicting when certain maintenance operations will be required for the engine would be useful.

BRIEF DESCRIPTION

Aspects and advantages of the invention will be set forth in part in the following description, or may be obvious from the description, or may be learned through practice of the invention.

In one exemplary aspect of the present disclosure, a computer-implemented method of assessing a health of a gas turbine engine of a hybrid-electric propulsion system for an aircraft is provided. The hybrid-electric propulsion system includes an electric machine rotatable with the gas turbine engine. The method includes receiving, by one or more computing devices, data indicative of an amount of electrical power provided to, or extracted from, the electric machine. The method also includes receiving, by the one or more computing devices, data indicative of an operating parameter of the hybrid-electric propulsion system. The method also includes assessing, by the one or more computing devices, a health of the gas turbine engine based at least in part on the received data indicative of the amount of electrical power provided to, or extracted from, the electric machine and the received data indicative of the operating parameter of the hybrid electric propulsion system. The method also includes providing, by the one or more computing devices, information to a user indicative of the health of the gas turbine engine.

In certain exemplary aspects receiving, by the one or more computing devices, data indicative of the operating parameter of the hybrid electric propulsion system includes receiving, by the one or more computing devices, data indicative of an operating parameter of the gas turbine engine.

For example, in certain exemplary aspects receiving, by the one or more computing devices, data indicative of the operating parameter of the gas turbine engine includes receiving, by the one or more computing devices, data indicative of one or more of a temperature within the gas turbine engine, a rotational speed of one or more components of the gas turbine engine, an amount of fuel provided to a combustion section of the gas turbine engine, or data indicative of a pressure within the gas turbine engine.

For example, in certain exemplary aspects receiving, by the one or more computing devices, data indicative of the amount of electrical power provided to, or extracted from, the electric machine includes receiving, by the one or more computing devices, data indicative of the amount of electrical power extracted from the electric machine.

For example, in certain exemplary aspects receiving, by the one or more computing devices, data indicative of the amount of electrical power provided to, or extracted from, the electric machine includes receiving, by the one or more computing devices, data indicative of the amount of electrical power provided to the electric machine.

In certain exemplary aspects, the method further includes changing, by the one or more computing devices, an amount of fuel provided to the combustion section of the gas turbine engine for an amount of time, wherein receiving, by the one or more computing devices, data indicative of the amount of electrical power provided to, or extracted from, the electric machine includes receiving, by the one or more computing devices, data indicative of a change in the amount of electrical power provided to, or extracted from, the electric machine during at least a portion of the amount of time.

For example, in certain exemplary aspects receiving, by the one or more computing devices, data indicative of the operating parameter of the hybrid-electric propulsion system includes receiving, by the one or more computing devices, data indicative of a change in a fuel flow parameter during the amount of time.

In certain exemplary aspects receiving, by the one or more computing devices, data indicative of the amount of electrical power provided to, or extracted from, the electric machine includes receiving, by the one or more computing devices, data indicative of the amount of electrical power provided to, or extracted from, the electric machine over a plurality of operation cycles, wherein receiving, by the one or more computing devices, data indicative of the operating parameter of the hybrid-electric propulsion system includes receiving, by the one or more computing devices, data indicative of the operating parameter of the hybrid-electric propulsion system over the plurality of operation cycles, and wherein assessing, by the one or more computing devices, the health of the gas turbine engine includes comparing, by the one or more computing devices, the received data indicative of the amount of electrical power provided to, or extracted from, the electric machine over the plurality of operation cycles and the received data indicative of the operating parameter of the hybrid-electric propulsion system over the plurality of operation cycles.

For example, in certain exemplary aspects assessing, by the one or more computing devices, the health of the gas turbine engine further includes trending, by the one or more computing devices, the compared information over a time variable or a cycle variable.

For example, in certain exemplary aspects assessing, by the one or more computing devices, the health of the gas turbine engine further includes determining, by the one or more computing devices, an amount of time, a number of cycles, or both until a maintenance operation is needed for the gas turbine engine based on the trending of the compared information over the time variable or the cycle variable.

In certain exemplary aspects, the method further includes modifying, by the one or more computing devices, an engine parameter indicative of a stall margin of the gas turbine engine in response to the assessment, by the one or more computing devices, of the health of the gas turbine.

In certain exemplary aspects providing, by the one or more computing devices, information to the user indicative of the health of the gas turbine engine includes displaying, by the one or more computing devices, the health of the gas turbine engine on a user interface device.

In certain exemplary aspects, the method further includes scheduling, by the one or more computing devices, a maintenance operation for the gas turbine engine in response to assessing, by the one or more computing devices, the health of the gas turbine engine.

In an exemplary embodiment of the present disclosure, a hybrid-electric propulsion system for an aircraft is provided. The hybrid electric propulsion system includes an electric machine, a gas turbine engine mechanically coupled to the electric machine for driving the electric machine, and an electric propulsor assembly electrically connectable to the electric machine. The hybrid electric propulsion system further includes a controller including memory and one or more processors, the memory storing instructions that when executed by the one or more processors cause the hybrid-electric propulsion system to perform functions. The functions include receiving data indicative of an amount of electrical power provided to, or extracted from, the electric machine; receiving data indicative of an operating parameter of the hybrid-electric propulsion system; assessing a health of the gas turbine engine based at least in part on the received data indicative of the amount of electrical power provided to, or extracted from, the electric machine and the received data indicative of the operating parameter of the hybrid electric propulsion system; and providing information to a user indicative of the health of the gas turbine engine.

In certain exemplary embodiments receiving data indicative of the operating parameter of the hybrid electric propulsion system includes receiving data indicative of an operating parameter of the gas turbine engine. For example, in certain exemplary embodiments receiving data indicative of the operating parameter of the gas turbine engine includes receiving data indicative of one or more of a temperature within the gas turbine engine, a rotational speed of one or more components of the gas turbine engine, an amount of fuel provided to a combustion section of the gas turbine engine, or data indicative of a pressure within the gas turbine engine.

In certain exemplary embodiments the functions further include changing an amount of fuel provided to the combustion section of the gas turbine engine for an amount of time, wherein receiving data indicative of the amount of electrical power provided to, or extracted from, the electric machine includes receiving data indicative of a change in the amount of electrical power provided to, or extracted from, the electric machine during at least a portion of the amount of time.

In certain exemplary embodiments receiving data indicative of the operating parameter of the hybrid-electric propulsion system includes receiving data indicative of a change in a fuel flow parameter during the amount of time.

In certain exemplary embodiments receiving data indicative of the amount of electrical power provided to, or extracted from, the electric machine includes receiving data indicative of the amount of electrical power provided to, or extracted from, the electric machine over a plurality of operation cycles, wherein receiving data indicative of the operating parameter of the hybrid-electric propulsion system includes receiving data indicative of the operating parameter of the hybrid-electric propulsion system over the plurality of operation cycles, and wherein assessing the health of the gas turbine engine includes comparing the received data indicative of the amount of electrical power provided to, or extracted from, the electric machine over the plurality of operation cycles and the received data indicative of the operating parameter of the hybrid-electric propulsion system over the plurality of operation cycles.

In another exemplary embodiment of the present disclosure, an engine health assessment control system is provided for a hybrid electric propulsion system having a gas turbine engine. The control system includes one or more controllers including memory and one or more processors, the memory storing instructions that when executed by the one or more processors cause the engine health assessment control system to perform functions. The functions include receiving data indicative of an amount of electrical power provided to, or extracted from, the electric machine; receiving data indicative of an operating parameter of the hybrid-electric propulsion system; assessing a health of the gas turbine engine based at least in part on the received data indicative of the amount of electrical power provided to, or extracted from, the electric machine and the received data indicative of the operating parameter of the hybrid electric propulsion system; and providing information to a user indicative of the health of the gas turbine engine.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION

Figure 1:
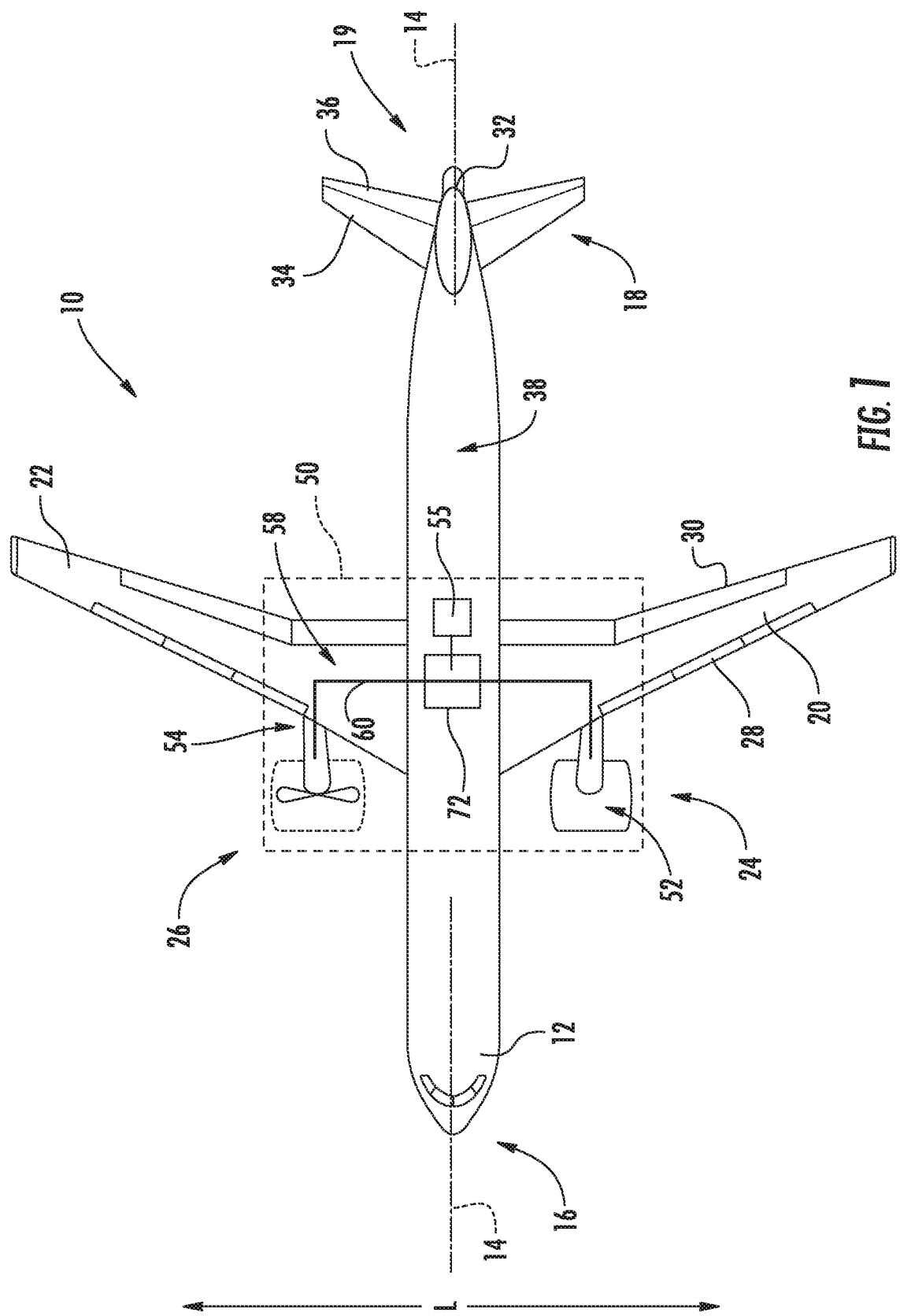
FIG. 1 is a top view of an aircraft according to various exemplary embodiments of the present disclosure.

Reference will now be made in detail to present embodiments of the invention, one or more examples of which are illustrated in the accompanying drawings. The detailed description uses numerical and letter designations to refer to features in the drawings. Like or similar designations in the drawings and description have been used to refer to like or similar parts of the invention.

As used herein, the terms "first", "second", and "third" may be used interchangeably to distinguish one component from another and are not intended to signify location or importance of the individual components.

The terms "forward" and "aft" refer to relative positions within a gas turbine engine or vehicle, and refer to the normal operational attitude of the gas turbine engine or vehicle. For example, with regard to a gas turbine engine, forward refers to a position closer to an engine inlet and aft refers to a position closer to an engine nozzle or exhaust.

The terms "upstream" and "downstream" refer to the relative direction with respect to a flow in a pathway. For example, with respect to a fluid flow, "upstream" refers to the direction from which the fluid flows, and "downstream" refers to the direction to which the fluid flows. However, the terms "upstream" and "downstream" as used herein may also refer to a flow of electricity.

The singular forms "a", "an", and "the" include plural references unless the context clearly dictates otherwise.

Approximating language, as used herein throughout the specification and claims, is applied to modify any quantitative representation that could permissibly vary without resulting in a change in the basic function to which it is related. Accordingly, a value modified by a term or terms, such as "about", "approximately", and "substantially", are not to be limited to the precise value specified. In at least some instances, the approximating language may correspond to the precision of an instrument for measuring the value, or the precision of the methods or machines for constructing or manufacturing the components and/or systems. For example, the approximating language may refer to being within a ten percent margin.

Here and throughout the specification and claims, range limitations are combined and interchanged, such ranges are identified and include all the sub-ranges contained therein unless context or language indicates otherwise. For example, all ranges disclosed herein are inclusive of the endpoints, and the endpoints are independently combinable with each other.

The present disclosure generally provides for a hybrid-electric propulsion system having a gas turbine engine, an electric machine, an electric propulsor assembly, and an energy storage unit. The gas turbine engine is drivingly connected to the electric machine, and the electric machine is configured to provide electrical power to, or receive electrical power from, the energy storage unit and the electric propulsor assembly. The present disclosure further provides for a method for assessing a health of the gas turbine engine based at least in part on the amount of electrical power provided to, or extracted from, the electric machine during operation of the hybrid electric propulsion system.

In certain exemplary aspects, the method, which may be a computer implemented method, generally receives data indicative of an amount of electrical power provided to, or extracted from, the electric machine, as well as data indicative of an operating parameter of the hybrid electric propulsion system. The method may then assess a health of the gas turbine engine based at least in part on the received data indicative of the amount of electrical power provided to, or extracted from, the electric machine and the received data indicative of the operating parameter of the hybrid electric propulsion system.

For example, in certain aspects, the operating parameter of the hybrid electric propulsion system may be an operating parameter of the gas turbine engine, such as a temperature within the gas turbine engine, a rotational speed of one or more components of the gas turbine engine, an amount of fuel provided to a combustion section of the gas turbine engine, or data indicative of a pressure within the gas turbine engine (which may, in turn, be indicative of an amount of thrust being produced by the gas turbine engine). One or more of these operating parameters in combination with the amount of electrical power being provided to, or being extracted from, the electric machine during operation of the hybrid electric propulsion system may then be used to determine a health of the gas turbine engine. For example, the combination of this information may generally indicate an efficiency at which the gas turbine engine is converting fuel to power (i.e., electrical power and/or mechanical power), which in turn is indicative of engine health.

Additionally, in certain exemplary aspects, the method may determine the health of the gas turbine engine by "probing" the hybrid electric propulsion system. For example, in certain exemplary aspects, the method may include changing an amount of fuel provided to the combustion section of the gas turbine engine for an amount of time. For example, the method may briefly increase an amount of fuel provided to the combustion section of the gas turbine engine and measure a response of the hybrid electric propulsion system to assess a health of the gas turbine engine. More particularly, with such an exemplary aspect, the method may determine a change in the amount of electrical power provided, or extracted from, the electric machine during at least a portion of the amount of time, and further, the operating parameter of the hybrid electric propulsion system may be a change in a fuel flow parameter during the amount of time.

Moreover, in still other exemplary aspects, the method may determine electrical power provided to, or extracted from, the electric machine over a plurality of operation cycles, and further may determine the operating parameter of the hybrid electric propulsion system over the same plurality of operation cycles. With such an exemplary aspect, assessing the health of the gas turbine engine may include comparing the determined electrical power provided to, or extracted from, the electric machine over the plurality of operation cycles and the determined operating parameter of the hybrid electric propulsion system over the same plurality of operation cycles. More specifically, in certain exemplary aspects, assessing the health of the gas turbine engine may include trending this data over a time variable or a cycle variable, and further may include determining an amount of time, or number of cycles, until a maintenance operation for the gas turbine engine is needed based on the trending of the compared data over the time variable or cycle variable.

Operating a hybrid electric propulsion system in accordance with one or more these exemplary aspects may have the technical effect of providing more accurate health assessment data for a gas turbine engine of the hybrid electric propulsion system. For example, operating a hybrid electric propulsion system in accordance with one or more of these exemplary aspects may allow for real-time health assessment of a gas turbine engine of the hybrid electric propulsion system, or predictive analysis of a health of the gas turbine engine of the hybrid electric propulsion system.

Referring now to the drawings, wherein identical numerals indicate the same elements throughout the figures, FIG. 1 provides a top view of an exemplary aircraft 10 as may incorporate various embodiments of the present disclosure. As shown in FIG. 1, the aircraft 10 defines a longitudinal centerline 14 that extends therethrough, a lateral direction L, a forward end 16, and an aft end 18. Moreover, the aircraft 10 includes a fuselage 12, extending longitudinally from the forward end 16 of the aircraft 10 to the aft end 18 of the aircraft 10, and an empennage 19 at the aft end of the aircraft 10. Additionally, the aircraft 10 includes a wing assembly including a first, port side wing 20 and a second, starboard side wing 22. The first and second wings 20, 22 each extend laterally outward with respect to the longitudinal centerline 14. The first wing 20 and a portion of the fuselage 12 together define a first side 24 of the aircraft 10, and the second wing 22 and another portion of the fuselage 12 together define a second side 26 of the aircraft 10. For the embodiment depicted, the first side 24 of the aircraft 10 is configured as the port side of the aircraft 10, and the second side 26 of the aircraft 10 is configured as the starboard side of the aircraft 10.

Each of the wings 20, 22 for the exemplary embodiment depicted includes one or more leading edge flaps 28 and one or more trailing edge flaps 30. The aircraft 10 further includes, or rather, the empennage 19 of the aircraft 10 includes, a vertical stabilizer 32 having a rudder flap (not shown) for yaw control, and a pair of horizontal stabilizers 34, each having an elevator flap 36 for pitch control. The fuselage 12 additionally includes an outer surface or skin 38. It should be appreciated however, that in other exemplary embodiments of the present disclosure, the aircraft 10 may additionally or alternatively include any other suitable configuration. For example, in other embodiments, the aircraft 10 may include any other configuration of stabilizer.

Figure 2:
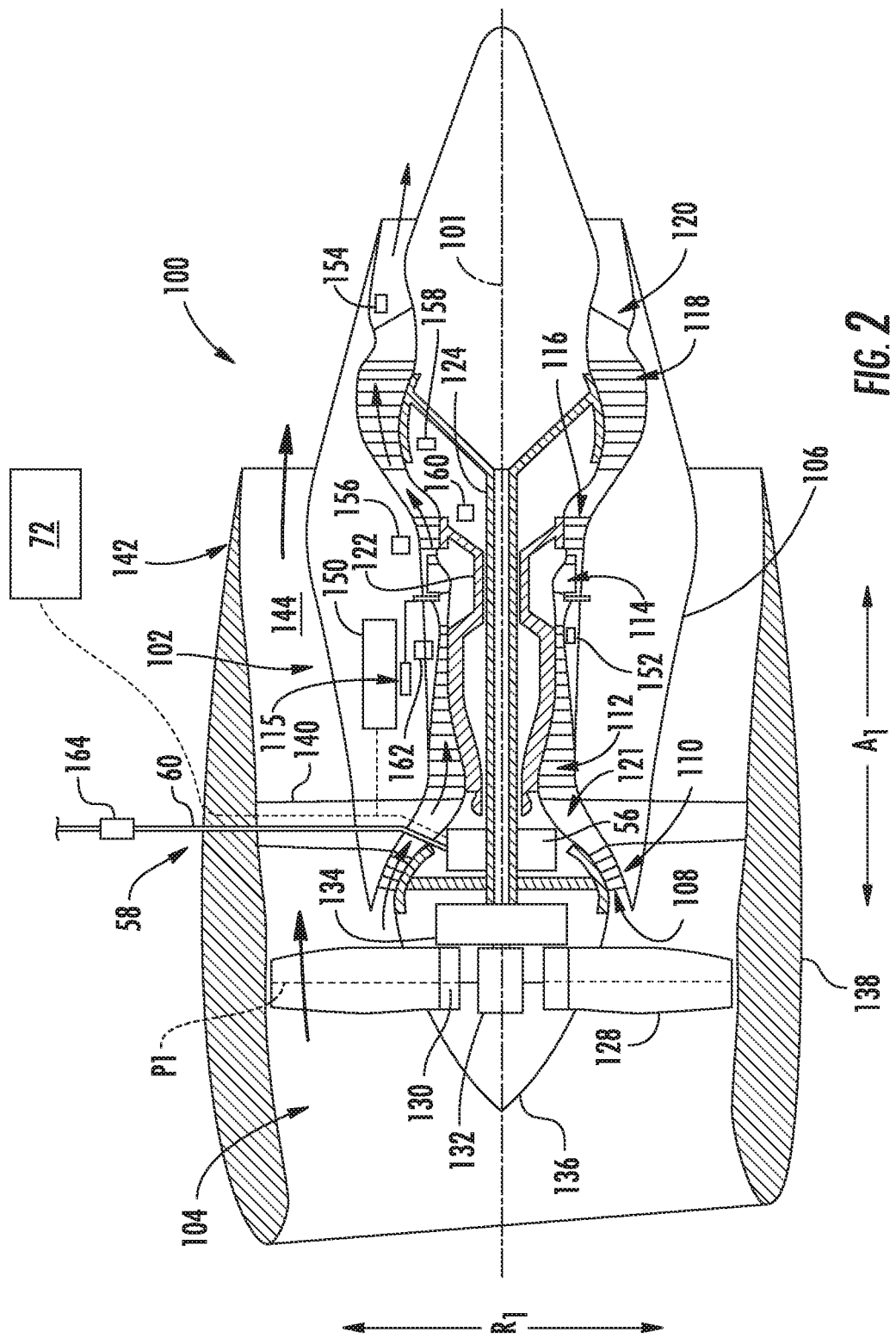
FIG. 2 is a schematic, cross-sectional view of a gas turbine engine mounted to the exemplary aircraft of FIG. 1.
Figure 3:
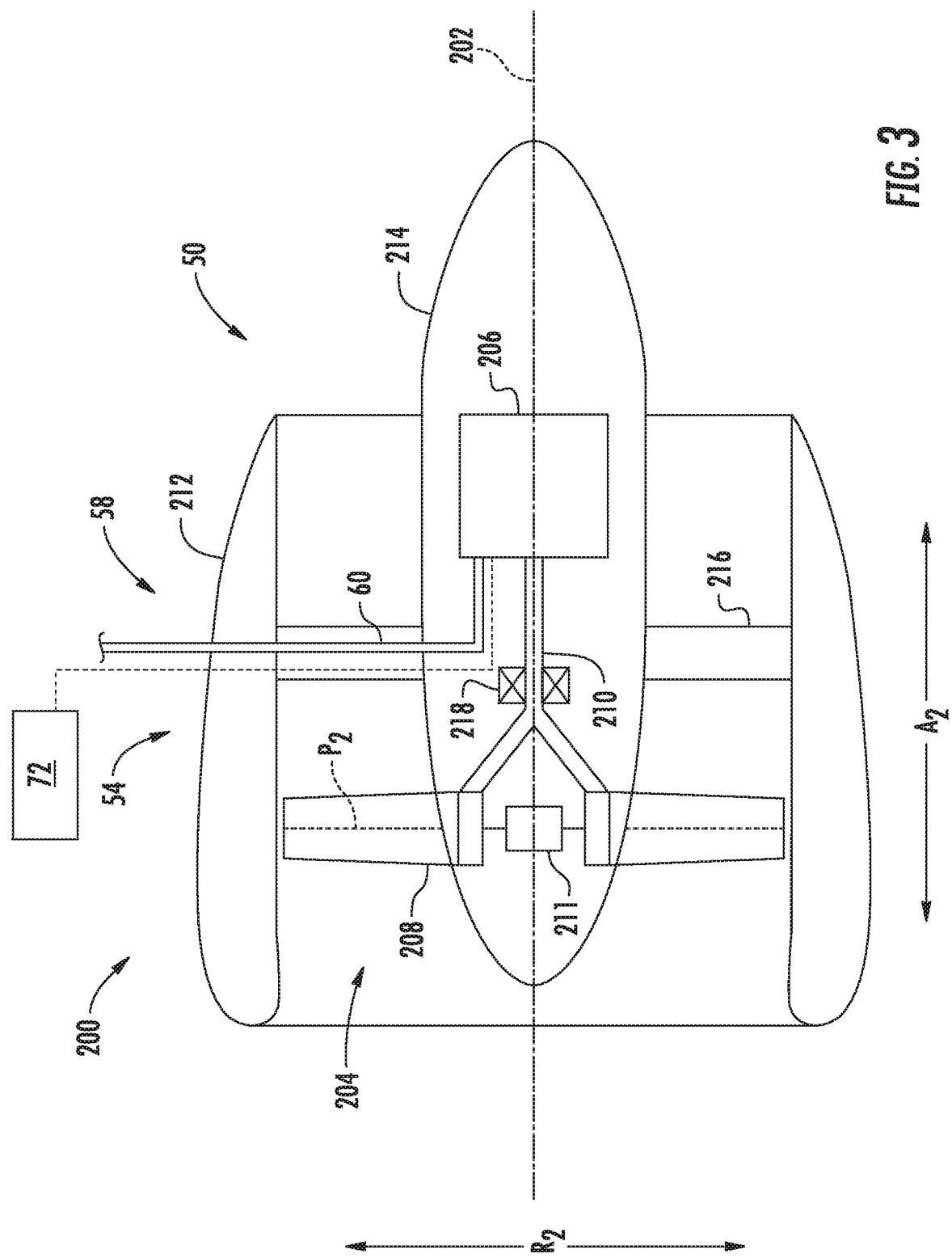
FIG. 3 is a schematic, cross-sectional view of an electric fan assembly in accordance with an exemplary embodiment of the present disclosure.

Referring now also to FIGS. 2 and 3, the exemplary aircraft 10 of FIG. 1 additionally includes a hybrid-electric propulsion system 50 having a first propulsor assembly 52 and a second propulsor assembly 54. FIG. 2 provides a schematic, cross-sectional view of the first propulsor assembly 52, and FIG. 3 provides a schematic, cross-sectional view of the second propulsor assembly 54. For the embodiment depicted, the first propulsor assembly 52 and second propulsor assembly 54 are each configured in an underwing-mounted configuration. However, as will be discussed below, one or both of the first and second propulsor assemblies 52, 54 may in other exemplary embodiments be mounted at any other suitable location.

Referring generally to FIGS. 1 through 3, the exemplary hybrid-electric propulsion system 50 generally includes the first propulsor assembly 52 having a combustion engine and a prime propulsor (which, for the embodiment of FIG. 2 are configured together as a gas turbine engine, or rather as a turbofan engine 100), an electric machine 56 (which for the embodiment depicted in FIG. 2 is an electric motor/generator) drivingly coupled to the combustion engine, the second propulsor assembly 54 (which for the embodiment of FIG. 3 is configured as an electric propulsor assembly 200 electrically connectable to the electric machine 56), an electric energy storage unit 55, a controller 72, and a power bus 58. The electric propulsor assembly 200, the electric energy storage unit 55, and the electric machine 56 are each electrically connectable through one or more electric lines 60 of the power bus 58. For example, the power bus 58 may include various switches or other power electronics movable to selectively electrically connect the various components of the hybrid electric propulsion system 50. Additionally, the power bus 58 may further include power electronics, such as inverters, converters, rectifiers, etc., for conditioning or converting electrical power within the hybrid electric propulsion system 50.

As will be appreciated, the controller 72 may be configured to distribute electrical power between the various components of the hybrid-electric propulsion system 50. For example, the controller 72 may be operable with the power bus 58 (including the one or more switches or other power electronics) to provide electrical power to, or draw electrical power from, the various components, such as the electric machine 56, to operate the hybrid electric propulsion system 50 between various operating modes. Such is depicted schematically as the electric lines 60 of the power bus 58 extending through the controller 72.

The controller 72 may be a stand-alone controller, dedicated to the hybrid-electric propulsion system 50, or alternatively, may be incorporated into one or more of a main system controller for the aircraft 10, a separate controller for the exemplary turbofan engine 100 (such as a full authority digital engine control system for the turbofan engine 100, also referred to as a FADEC), etc.

Additionally, the electric energy storage unit 55 may be configured as one or more batteries, such as one or more lithium-ion batteries, or alternatively may be configured as any other suitable electrical energy storage devices. It will be appreciated that for the hybrid-electric propulsion system 50 described herein, the electric energy storage unit 55 is configured to store a relatively large amount of electrical power. For example, in certain exemplary embodiments, the electric energy storage unit may be configured to store at least about fifty kilowatt hours of electrical power, such as at least about sixty-five kilowatt hours of electrical power, such as at least about seventy-five kilowatts hours of electrical power, and up to about five hundred kilowatt hours of electrical power.

Referring now particularly to FIGS. 1 and 2, the first propulsor assembly 52 includes a gas turbine engine mounted, or configured to be mounted, to the first wing 20 of the aircraft 10. More specifically, for the embodiment of FIG. 2, the gas turbine engine includes a turbomachine 102 and a prime propulsor, the prime propulsor being a fan (referred to as "fan 104" with reference to FIG. 2). Accordingly, for the embodiment of FIG. 2, the gas turbine engine is configured as a turbofan engine 100.

The turbofan engine 100 defines an axial direction A1 (extending parallel to a longitudinal centerline 101 provided for reference) and a radial direction R1. As stated, the turbofan engine 100 includes the fan 104 and the turbomachine 102 disposed downstream from the fan 104.

The exemplary turbomachine 102 depicted generally includes a substantially tubular outer casing 106 that defines an annular inlet 108. The outer casing 106 encases, in serial flow relationship, a compressor section including a booster or low pressure (LP) compressor 110 and a high pressure (HP) compressor 112; a combustion section 114; a turbine section including a first, high pressure (HP) turbine 116 and a second, low pressure (LP) turbine 118; and a jet exhaust nozzle section 120. The compressor section, combustion section 114, and turbine section together define at least in part a core air flowpath 121 through the turbomachine 102. Additionally, the turbofan engine 100 includes a fuel delivery system 115 for providing fuel to the combustion section 114.

The exemplary turbomachine 102 of the turbofan engine 100 additionally includes one or more shafts rotatable with at least a portion of the turbine section and, for the embodiment depicted, at least a portion of the compressor section. More particularly, for the embodiment depicted, the turbofan engine 100 includes a high pressure (HP) shaft or spool 122, which drivingly connects the HP turbine 116 to the HP compressor 112. Additionally, the exemplary turbofan engine 100 includes a low pressure (LP) shaft or spool 124, which drivingly connects the LP turbine 118 to the LP compressor 110.

Further, the exemplary fan 104 depicted is configured as a variable pitch fan having a plurality of fan blades 128 coupled to a disk 130 in a spaced apart manner. The fan blades 128 extend outwardly from disk 130 generally along the radial direction R1. Each fan blade 128 is rotatable relative to the disk 130 about a respective pitch axis P1 by virtue of the fan blades 128 being operatively coupled to a suitable actuation member 132 configured to collectively vary the pitch of the fan blades 128. The fan 104 is mechanically coupled to the LP shaft 124, such that the fan 104 is mechanically driven by the second, LP turbine 118. More particularly, the fan 104, including the fan blades 128, disk 130, and actuation member 132, is mechanically coupled to the LP shaft 124 through a power gearbox 134, and is rotatable about the longitudinal axis 101 by the LP shaft 124 across the power gear box 134. The power gear box 134 includes a plurality of gears for stepping down the rotational speed of the LP shaft 124 to a more efficient rotational fan speed. Accordingly, the fan 104 is powered by an LP system (including the LP turbine 118) of the turbomachine 102.

Referring still to the exemplary embodiment of FIG. 2, the disk 130 is covered by rotatable front hub 136 aerodynamically contoured to promote an airflow through the plurality of fan blades 128. Additionally, the turbofan engine 100 includes an annular fan casing or outer nacelle 138 that circumferentially surrounds the fan 104 and/or at least a portion of the turbomachine 102. Accordingly, the exemplary turbofan engine 100 depicted may be referred to as a "ducted" turbofan engine. Moreover, the nacelle 138 is supported relative to the turbomachine 102 by a plurality of circumferentially-spaced outlet guide vanes 140. A downstream section 142 of the nacelle 138 extends over an outer portion of the turbomachine 102 so as to define a bypass airflow passage 144 therebetween.

Referring still to FIG. 2, the hybrid-electric propulsion system 50 additionally includes an electric machine 56, which for the embodiment depicted is configured as an electric motor/generator. The electric machine 56 is, for the embodiment depicted, positioned within the turbomachine 102 of the turbofan engine 100, inward of the core air flowpath 121, and is in mechanical communication with one of the shafts of the turbofan engine 100. More specifically, for the embodiment depicted, the electric machine is driven by the second, LP turbine 118 through the LP shaft 124. The electric machine 56 may be configured to convert mechanical power of the LP shaft 124 to electric power, or alternatively the electric machine 56 may be configured to convert electrical power provided thereto into mechanical power for the LP shaft 124.

It should be appreciated, however, that in other exemplary embodiments, the electric machine 56 may instead be positioned at any other suitable location within the turbomachine 102 or elsewhere. For example, the electric machine 56 may be, in other embodiments, mounted coaxially with the LP shaft 124 within the turbine section, or alternatively may be offset from the LP shaft 124 and driven through a suitable gear train. Additionally, or alternatively, in other exemplary embodiments, the electric machine 56 may instead be powered by the HP system, i.e., by the HP turbine 116 through, e.g., the HP shaft 122, or by both the LP system (e.g., the LP shaft 124) and the HP system (e.g., the HP shaft 122) via a dual drive system. Additionally, or alternatively, still, in other embodiments, the electric machine 56 may include a plurality of electric machines, e.g., with one being drivingly connected to the LP system (e.g., the LP shaft 124) and one being drivingly connected to the HP system (e.g., the HP shaft 122). Further, although the electric machine 56 is described as an electric motor/generator, in other exemplary embodiments, the electric machine 56 may be configured solely as an electric motor, or solely as an electric generator.

Referring still to FIGS. 1 and 2, the turbofan engine 100 further includes a controller 150 and a plurality of sensors. For example, for the embodiment depicted, the plurality of sensors may be configured to sense data indicative of various operating parameters of the turbofan engine 100. For example, the one or more sensors may be configured to determine a temperature within the gas turbine engine, a rotational speed of one or more components of the gas turbine engine, an amount of fuel provided to the combustion section 114 of the gas turbine engine, and/or an amount of thrust being generated by the gas turbine engine. More specifically, for the embodiment depicted, the plurality of sensors include: a sensor 152 for sensing data indicative of a compressor exit temperature; a sensor 154 configured for sensing data indicative of an exhaust gas temperature; a sensor 156 configured for sensing data indicative of a turbine inlet temperature; a sensor 158 configured for sensing data indicative of a rotational speed of the LP shaft 124; a sensor 160 configured for sensing data indicative of a rotational speed of the HP shaft 122; a sensor 162 operable with the fuel delivery system 115 and configured for sensing data indicative of a fuel flow parameter to the combustion section 114; and a sensor 164 operable with one or both of the electric machine 56 and the power bus 58 for sensing data indicative of an amount of electrical power provided to, or extracted from, the electric machine 56. Notably, in other exemplary embodiments, the sensor 164 may be positioned at any other suitable location, or configured in any suitable manner, for sensing data indicative of an amount of electrical power provided to, or extracted from, the electric machine 56.

Moreover, the controller 150 may be a full authority digital engine control system, also referred to as a FADEC. The controller 150 of the turbofan engine 100 may be configured to control operation of, e.g., the actuation member 132, the fuel delivery system 115 for the combustion section 114, etc. Additionally, the controller 150 may be operably connected to the plurality of sensors 152, 154, 156, 158, 160, 162 and configured to receive data sensed by the respective sensors to determine various operational parameters of the turbofan engine 100. Further, referring back also to FIG. 1, the controller 150 of the turbofan engine 100 is operably connected to the controller 72 of the hybrid-electric propulsion system 50. Moreover, as will be appreciated, the controller 72 may further be operably connected to one or more of the first propulsor assembly 52 (including controller 150), the electric machine 56, the second propulsor assembly 54, and the energy storage unit 55 through a suitable wired or wireless communication system (depicted in phantom).

It should further be appreciated that the exemplary turbofan engine 100 depicted in FIG. 2 may, in other exemplary embodiments, have any other suitable configuration. For example, in other exemplary embodiments, the fan 104 may not be a variable pitch fan, and further, in other exemplary embodiments, the LP shaft 124 may be directly mechanically coupled to the fan 104 (i.e., the turbofan engine 100 may not include the gearbox 134). Further, it should be appreciated that in other exemplary embodiments, the turbofan engine 100 may be configured as any other suitable gas turbine engine. For example, in other embodiments, the turbofan engine 100 may instead be configured as a turboprop engine, an unducted turbofan engine, a turbojet engine, a turboshaft engine, etc.

Referring now particularly to FIGS. 1 and 3, as previously stated the exemplary hybrid-electric propulsion system 50 additionally includes the second propulsor assembly 54 mounted, for the embodiment depicted, to the second wing 22 of the aircraft 10. Referring particularly to FIG. 3, the second propulsor assembly 54 is generally configured as an electric propulsor assembly 200 including an electric motor 206 and a propulsor/fan 204. The electric propulsor assembly 200 defines an axial direction A2 extending along a longitudinal centerline axis 202 that extends therethrough for reference, as well as a radial direction R2. For the embodiment depicted, the fan 204 is rotatable about the centerline axis 202 by the electric motor 206.

The fan 204 includes a plurality of fan blades 208 and a fan shaft 210. The plurality of fan blades 208 are attached to/rotatable with the fan shaft 210 and spaced generally along a circumferential direction of the electric propulsor assembly 200 (not shown). In certain exemplary embodiments, the plurality of fan blades 208 may be attached in a fixed manner to the fan shaft 210, or alternatively, the plurality of fan blades 208 may be rotatable relative to the fan shaft 210, such as in the embodiment depicted. For example, the plurality of fan blades 208 each define a respective pitch axis P2, and for the embodiment depicted are attached to the fan shaft 210 such that a pitch of each of the plurality of fan blades 208 may be changed, e.g., in unison, by a pitch change mechanism 211. Changing the pitch of the plurality of fan blades 208 may increase an efficiency of the second propulsor assembly 54 and/or may allow the second propulsor assembly 54 to achieve a desired thrust profile. With such an exemplary embodiment, the fan 204 may be referred to as a variable pitch fan.

Moreover, for the embodiment depicted, the electric propulsor assembly 200 depicted additionally includes a fan casing or outer nacelle 212, attached to a core 214 of the electric propulsor assembly 200 through one or more struts or outlet guide vanes 216. For the embodiment depicted, the outer nacelle 212 substantially completely surrounds the fan 204, and particularly the plurality of fan blades 208. Accordingly, for the embodiment depicted, the electric propulsor assembly 200 may be referred to as a ducted electric fan.

Referring still particularly to FIG. 3, the fan shaft 210 is mechanically coupled to the electric motor 206 within the core 214, such that the electric motor 206 drives the fan 204 through the fan shaft 210. The fan shaft 210 is supported by one or more bearings 218, such as one or more roller bearings, ball bearings, or any other suitable bearings. Additionally, the electric motor 206 may be an inrunner electric motor (i.e., including a rotor positioned radially inward of a stator), or alternatively may be an outrunner electric motor (i.e., including a stator positioned radially inward of a rotor), or alternatively, still, may be an axial flux electric motor (i.e., with the rotor neither outside the stator nor inside the stator, but rather offset from it along the axis of the electric motor).

As briefly noted above, the electric power source (e.g., the electric machine 56 or the electric energy storage unit 55) is electrically connected with the electric propulsor assembly 200 (i.e., the electric motor 206) for providing electrical power to the electric propulsor assembly 200. More particularly, the electric motor 206 is in electrical communication with the electric machine 56 and/or the electric energy storage unit 55 through the electrical power bus 58, and more particularly through the one or more electrical cables or lines 60 extending therebetween.

It should be appreciated, however, that in other exemplary embodiments the exemplary hybrid-electric propulsion system 50 may have any other suitable configuration, and further, may be integrated into an aircraft 10 in any other suitable manner. For example, in other exemplary embodiments, the electric propulsor assembly 200 of the hybrid electric propulsion system 50 may instead be configured as a plurality of electric propulsor assemblies 200 and/or the hybrid electric propulsion system 50 may further include a plurality of gas turbine engines (such as turbofan engine 100) and electric machines 56. Further, in other exemplary embodiments, the electric propulsor assembly(ies) 200 and/or gas turbine engine(s) and electric machine(s) 56 may be mounted to the aircraft 10 at any other suitable location in any other suitable manner (including, e.g., tail mounted configurations).

Figure 4:
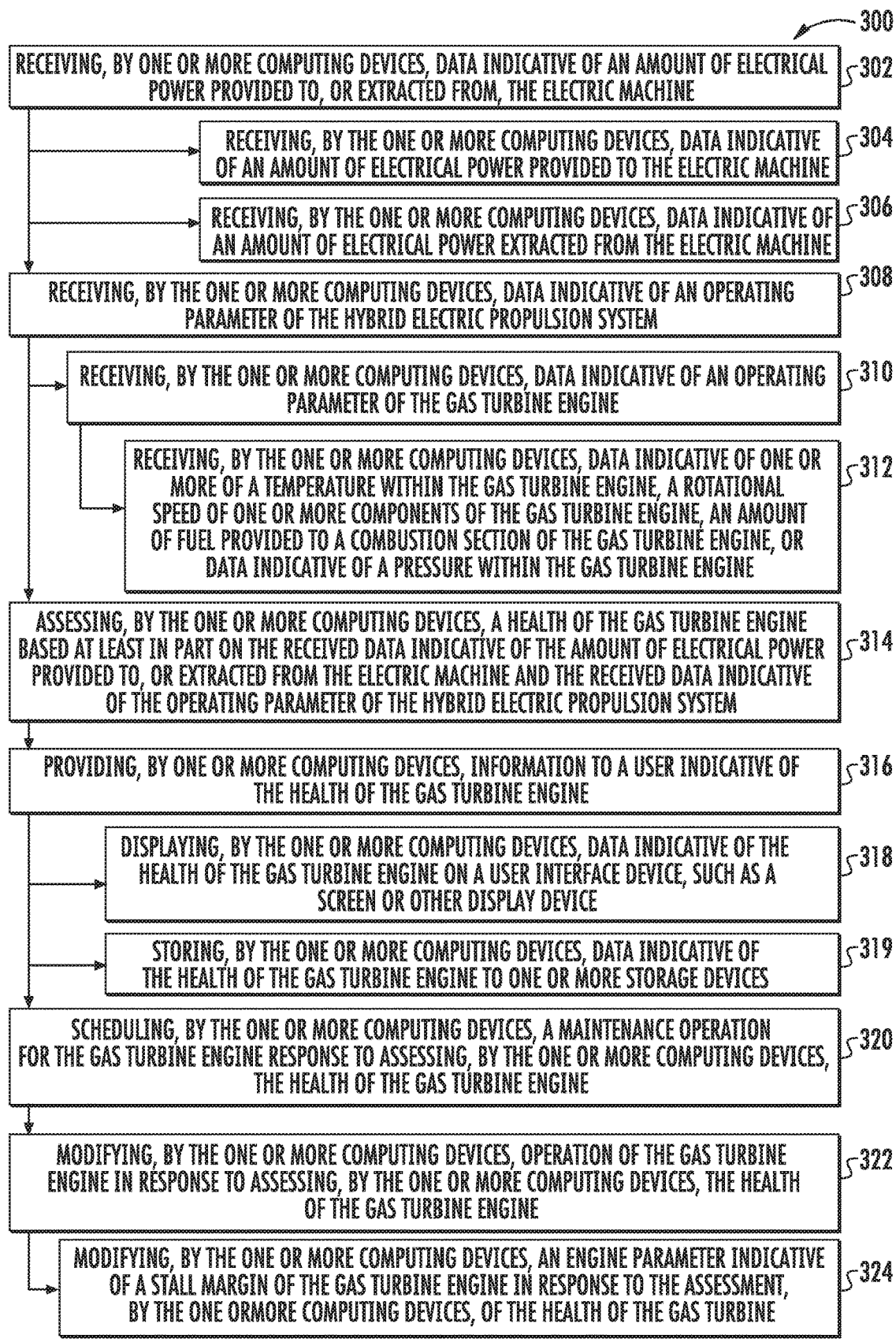
FIG. 4 is a flow diagram of a method of assessing a health of a gas turbine engine of a hybrid electric propulsion system in accordance with an exemplary aspect of the present disclosure.

Referring now to FIG. 4, a computer implemented method 300 of assessing a health of a gas turbine engine of a hybrid electric propulsion system for an aircraft is provided. The exemplary hybrid electric propulsion system may be configured in accordance with one or more of the exemplary embodiments described above with reference to FIGS. 1 through 3. Accordingly, in certain exemplary aspects, the hybrid electric propulsion system may, in addition to the gas turbine engine, include an electric machine rotatable with the gas turbine engine.

As is depicted, the exemplary method 300 generally includes at (302) receiving, by one or more computing devices, data indicative of an amount of electrical power provided to, or extracted from, the electric machine. For example, as is depicted in phantom, in certain exemplary aspects, receiving, by the one or more computing devices, the data at (302) may include at (304) receiving, by the one or more computing devices, data indicative of an amount of electrical power provided to the electric machine, or alternatively, may include at (306) receiving, by the one or more computing devices, data indicative of an amount of electrical power extracted from the electric machine. Notably, in certain exemplary aspects, receiving, by the one or more computing devices, data indicative of the amount of electrical power provided to, or extracted from, the electric machine at (302) may further include determining the amount of electrical power provided to, or extracted from, the electric machine based at least in part on data received by the one or more sensors.

Additionally, the method 300 includes at (308) receiving, by the one or more computing devices, data indicative of an operating parameter of the hybrid electric propulsion system. For the exemplary aspect of FIG. 4, receiving, by the one or more computing devices, data indicative of the operating parameter of the hybrid electric propulsion system at (308) includes at (310) receiving, by the one or more computing devices, data indicative of an operating parameter of the gas turbine engine. More specifically, for the exemplary aspect of FIG. 4, receiving, by the one or more computing devices, data indicative of the operating parameter of the gas turbine engine at (310) includes at (312) receiving, by the one or more computing devices, data indicative of one or more of a temperature within the gas turbine engine, a rotational speed of one or more components of the gas turbine engine, an amount of fuel provided to a combustion section of the gas turbine engine, or data indicative of a pressure within the gas turbine engine (which may, in turn, be indicative of an amount of thrust being produced by the gas turbine engine). In certain exemplary aspects, the temperature within the gas turbine engine may refer to, e.g., a compressor exit temperature, a turbine inlet temperature, or exhaust gas temperature. Additionally, in certain exemplary aspects, the rotational speed of one or more components of the gas turbine engine may include a rotational speed of a low pressure shaft or of a high pressure shaft. Moreover, in certain exemplary aspects, the pressure within the gas turbine may include a compressor exit pressure or a turbine exit pressure. Further, it should be appreciated that in certain exemplary aspects, receiving, by the one or more computing devices data indicative of one or more operating parameter(s) at (308), at (310), and at (312) may further include determining a value of the operating parameter(s).

Moreover, the method 300 further includes at (314) assessing, by the one or more computing devices, a health of the gas turbine engine based at least in part on the received data indicative of the amount of electrical power provided to, or extracted from, the electric machine at (302) and the received data indicative of the operating parameter of the hybrid electric propulsion system at (304).

For example, as will be appreciated the amount of electrical power provided to, or extracted from, the electric machine during a given operating mode may indicate a health of the engine, such as a deterioration value of the engine. The "operating mode" may be, e.g., a power level of the gas turbine engine, which may be determined based on the received data indicative of the one or more operating parameters of the hybrid electric propulsion system, such as of the gas turbine engine. Additionally, or alternatively, the operating mode may be determined by an aircraft parameter such as on-ground, takeoff, climb, cruise, or descent parameters. Additionally, or alternatively, still, a value of the one or more operating parameters of the hybrid electric propulsion system, such as of the gas turbine engine, which may be determined based on the received data indicative of the parameter, for a given power level of the electric machine (i.e., for a given amount of power provided by the electric machine or extracted from the electric machine), may also indicate a health the engine, such as the deterioration value of the engine. The deterioration value may be a percent deterioration, or any other suitable value.

By way of example only, in certain exemplary aspects, the method 300 may determine an exhaust gas temperature value while extracting a reference amount of electrical power from the electric machine. The value of the exhaust gas temperature for the reference amount of electrical power being extracted from the electric machine may be indicative of the health of the engine. For example, when the engine is new, or healthy, the exhaust gas temperature may be at a first value when extracting the reference amount of electrical power from the electric machine. By contrast when the engine is old, or relatively unhealthy, the exhaust gas temperature may be at a second, higher value when extracting the reference amount of electrical power from the electric machine.

Additionally, or alternatively, but also by way of example only, in other exemplary aspects, the method 300 may determine an amount of electrical power being extracted from the electric machine while the gas turbine engine is operated to define a reference exhaust gas temperature. With such an embodiment, the amount of electrical power being extracted from the gas turbine engine may be indicative of the health of the engine. For example, when the engine is new, or healthy, the electrical power being extracted from the gas turbine engine may be a first value while the gas turbine engine is operated at the reference exhaust gas temperature. By contrast, when the engine is old, or relatively unhealthy, the electric power being extracted from the gas turbine engine may be a second, lower value while the gas turbine engine is operated at the reference exhaust gas temperature.

Accordingly, as will be discussed in more detail below, assessing, by the one or more computing devices, the health of the gas turbine engine based at least in part on the received data indicative of the amount of electrical power provided to, or extracted from, the electric machine at (302) and the received data indicative of the operating parameter of the hybrid electric propulsion system at (304) may include comparing the received data indicative of the operating parameter of the hybrid electric propulsion system at (304) to a reference operating parameter value, a reference chart of operating parameter values, etc. to assess the engine health, and/or comparing the received data indicative of the amount of electrical power provided to, or extracted from the electric machine at (302) to a reference power level value, a reference chart of power level values, etc. to assess the engine health. It should be appreciated, of course, that in other exemplary embodiments, any other suitable gas turbine engine parameter, or hybrid electric propulsion system parameter, may be utilized.

Further, as is also depicted in FIG. 4, the exemplary aspect of the method 300 depicted includes at (316) providing, by one or more computing devices, information to a user indicative of the health of the gas turbine engine. For example, for the exemplary aspect of FIG. 4, providing, by the one or more computing devices, information to the user indicative of the health of the gas turbine engine at (316) includes at (318) displaying, by the one or more computing devices, data indicative of the health of the gas turbine engine on a user interface device, such as a screen or other display device, and at (319) storing, by the one or more computing devices, data indicative of the health of the gas turbine engine to one or more storage devices. The "user" may be a member of a flight crew of an aircraft including the exemplary propulsion system, or may be a user gathering data from, e.g., a fleet of aircraft, or alternatively may be any other suitable user.

Moreover, for the exemplary aspect of FIG. 4, the method 300 depicted includes at (320) scheduling, by the one or more computing devices, a maintenance operation for the gas turbine engine response to assessing, by the one or more computing devices, the health of the gas turbine engine at (314). For example, assessing, by the one or more computing devices, the health of the gas turbine engine at (314) may include determining, by the one or more computing devices, an engine deterioration value of the gas turbine engine is above the predetermined threshold, in which case, scheduling, by the one or more computing devices, the maintenance operation for the gas turbine engine at (320) may include scheduling, by the one or more computing devices, the maintenance operation for the gas turbine engine further in response to the determination that the engine deterioration value for the gas turbine engine being above the predetermined threshold.

Additionally, or alternatively, the method may modify operation of the hybrid electric propulsion system, including the gas turbine engine, in response to the assessed health of the gas turbine engine. More specifically, the exemplary aspect of the method 300 depicted includes at (322) modifying, by the one or more computing devices, operation of the gas turbine engine in response to assessing, by the one or more computing devices, the health of the gas turbine engine at (314). More specifically still, for the exemplary aspect depicted, modifying, by the one or more computing devices, operation of the gas turbine engine at (322) includes at (324) modifying, by the one or more computing devices, an engine parameter indicative of a stall margin of the gas turbine engine in response to the assessment, by the one or more computing devices, of the health of the gas turbine at (314). For example, as will be appreciated, as a health of the gas turbine engine declines (i.e., as the gas turbine engine degrades) a stall margin of the gas turbine engine may generally need to be increased (or rather an engine parameter indicative of, i.e., tied to, the stall margin may generally need to be increased) to reduce a risk of compressor stall within a compressor section of the gas turbine engine. Such an exemplary aspect may allow for a reduced stall margin, or at least a more appropriate stall margin, for the engine to be utilized during operation, potentially increasing an efficiency of the engine.

It should be appreciated, however, that in other exemplary aspects, the method 300 may be configured to assess a health of a gas turbine engine in any other suitable manner. For example, another exemplary aspect, the method 300 may be configured to "probe" the hybrid electric propulsion system to determine a health of a gas turbine engine of the electric propulsion system. More specifically, referring now to FIG. 5, such an exemplary aspect of the method 300 is provided. The exemplary aspect of FIG. 5 may be substantially the same as the exemplary aspect of FIG. 4.

Figure 5:
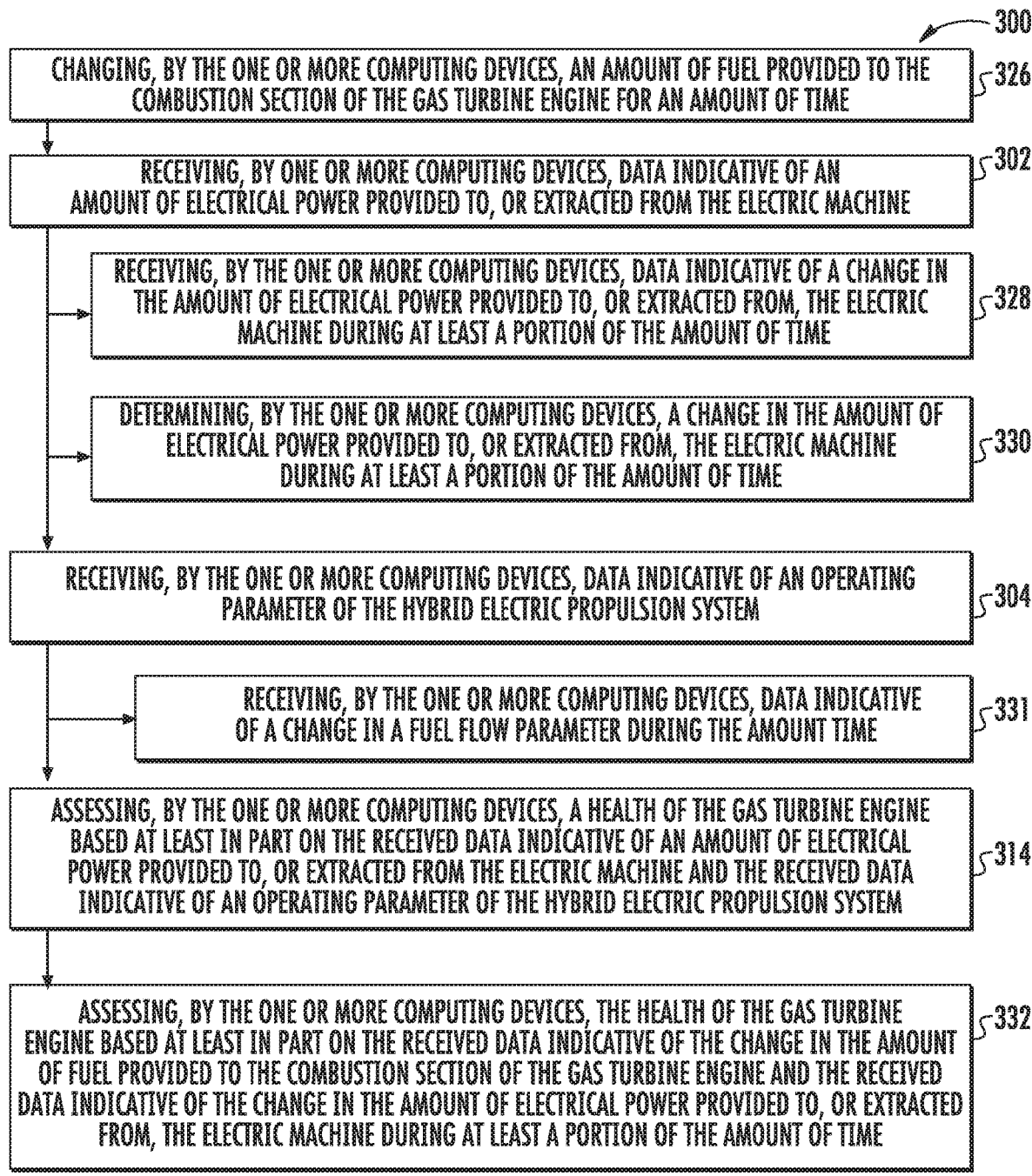
FIG. 5 is a flow diagram of a method of assessing a health of a gas turbine engine of a hybrid electric propulsion system in accordance with another exemplary aspect of the present disclosure.

For example, the exemplary aspect of the method 300 depicted in FIG. 5 generally includes at (302) receiving, by one or more computing devices, data indicative of an amount of electrical power provided to, or extracted from the electric machine; at (304) receiving, by the one or more computing devices, data indicative of an operating parameter of the hybrid electric propulsion system; and at (314) assessing, by the one or more computing devices, a health of the gas turbine engine based at least in part on the received data at (302) and the received data at (304).

However, as stated, the exemplary aspect of the method 300 depicted in FIG. 5 additionally includes "probing" the hybrid electric propulsion system. More specifically, for the exemplary aspect of the method 300 depicted in FIG. 5, the method 300 further includes at (326) changing, by the one or more computing devices, an amount of fuel provided to the combustion section of the gas turbine engine for an amount of time. In addition, for the exemplary aspect of the method 300 depicted in FIG. 5, determining, by the one or more computing devices, the amount of electrical power provided to, or extracted from, the electric machine at (302) includes at (328) receiving, by the one or more computing devices, data indicative of a change in the amount of electrical power provided to, or extracted from, the electric machine during at least a portion of the amount of time, and further, at (330) determining, by the one or more computing devices, a change in the amount of electrical power provided to, or extracted from, the electric machine during at least a portion of the amount of time. Notably, the amount of time may be a relatively short amount of time, such as one minute or less, such as thirty seconds or less, such as fifteen seconds or less, or such as five seconds or less.

For example, in certain exemplary aspects, changing, by the one or more computing devices, the amount of fuel provided to the combustion section of the gas turbine engine for the amount of time at (326) may include increasing the amount of fuel provided to the combustion section of the gas turbine engine for the amount of time. With such an exemplary aspect, determining, by the one or more computing devices, the change in the amount of electrical power provided to, or extracted from, the electric machine at (330) may further include determining, by the one or more computing devices, an increase in the amount of electrical power extracted from the electric machine during at least a portion of the amount of time.

Alternatively, in other exemplary aspects, changing, by the one or more computing devices, the amount of fuel provided to the combustion section of the gas turbine engine for the amount of time at (326) may include decreasing the amount of fuel provided to the combustion section of the gas turbine engine for the amount of time. With such an exemplary aspect, determining, by the one or more computing devices, the change in the amount of electrical power provided to, or extracted from, the electric machine at (330) may further include determining, by the one or more computing devices, a decrease in the amount of electrical power extracted from the electric machine during at least a portion of the amount of time.

Additionally, with such an exemplary aspect, receiving, by the one or more computing devices, data indicative of the operating parameter of the hybrid electric propulsion system at (304) may include at (331) receiving, by the one or more computing devices, data indicative of a change in a fuel flow parameter during the amount time. For example, the fuel flow parameter may be a fuel flowrate, or the total amount of fuel provided during a certain amount of time.

Figure 6:
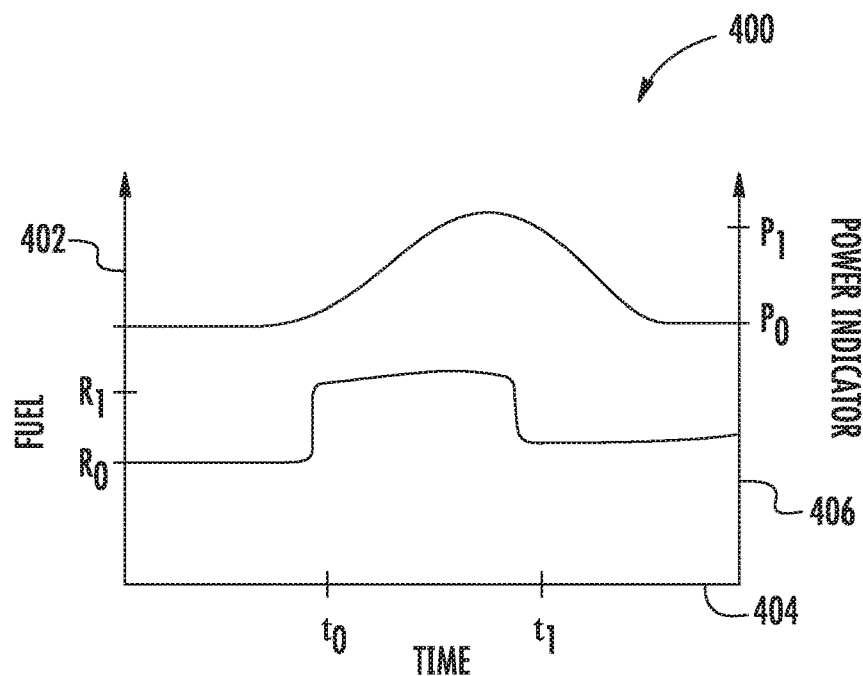
FIG. 6 is a chart depicting one or more exemplary aspects of the exemplary method of FIG. 5.

For example, referring now briefly to FIG. 6, a chart 400 depicting the exemplary aspect of the method 300 depicted in FIG. 5 is provided. As is shown, the chart 400 generally depicts a fuel flow parameter (on a first Y-axis 402) over of time (on an X-axis 404) and a power extracted from the electric machine (on a second Y-axis 406) over time (the power on the second Y-axis 406 being inferred from one or more power indicators/engine parameters). More particularly, the chart 400 of FIG. 6 depicts these parameters over the amount of time in which the fuel provided to the combustion section of the gas turbine engine is changed at (326). The amount of time is the time between $t_0$ and $t_1$ in the chart 400. Accordingly, as is depicted, between $t_0$ and $t_1$, the fuel flowrate parameter is increased from $R_0$ to $R_1$ at $t_0$, and then decreased from $R_1$ to $R_0$ at $t_1$. Similarly, in response increasing the fuel flowrate parameter, the amount of power extracted from the electric machine increases. More specifically, between $t_0$ and $t_1$ the amount of power extracted from the electric machine increases from $P_0$ to $P_1$.

As will be appreciated, referring back also to FIG. 5, the change in the amount of power provided, to or extracted from, the electric machine during the amount of time may therefore be indicative of a health of the gas turbine engine. Accordingly, for the exemplary aspect depicted in FIG. 5, assessing, by the one or more computing devices, the health of the gas turbine engine at (314) further includes at (332) assessing, by the one or more computing devices, the health of the gas turbine engine based at least in part on the received data indicative of the change in the amount of fuel provided to the combustion section of the gas turbine engine at (331) and the received data indicative of the change in the amount of electrical power provided to, or extracted from, the electric machine during at least a portion of the amount of time at (328). For example, in certain exemplary aspects, assessing, by the one or more computing devices, the health of the gas turbine engine at (332) may include comparing the received data indicative of the change in the amount of electrical power provided to, or extracted from, the electric machine at (328), for a given change in the amount of fuel provided to the combustion section the gas turbine engine determined based on the received data at (331), to a baseline number (e.g., a baseline amount of electrical power) to determine the health of the gas turbine engine, or alternatively to a schedule to determine the health of the gas turbine engine.

Alternatively, however, this information may be used in any other suitable manner to assess a health of the engine.

Furthermore, it should be appreciated, that in still other exemplary aspects of the present disclosure, the exemplary method 300 may be operable in still other suitable manners. For example, in other exemplary aspects of the present disclosure, the exemplary method 300 may be operable in a predictive manner to anticipate, e.g., necessary maintenance operations. Accordingly, referring now also to FIG. 7, another exemplary aspect of the method 300 is depicted.

Figure 7:
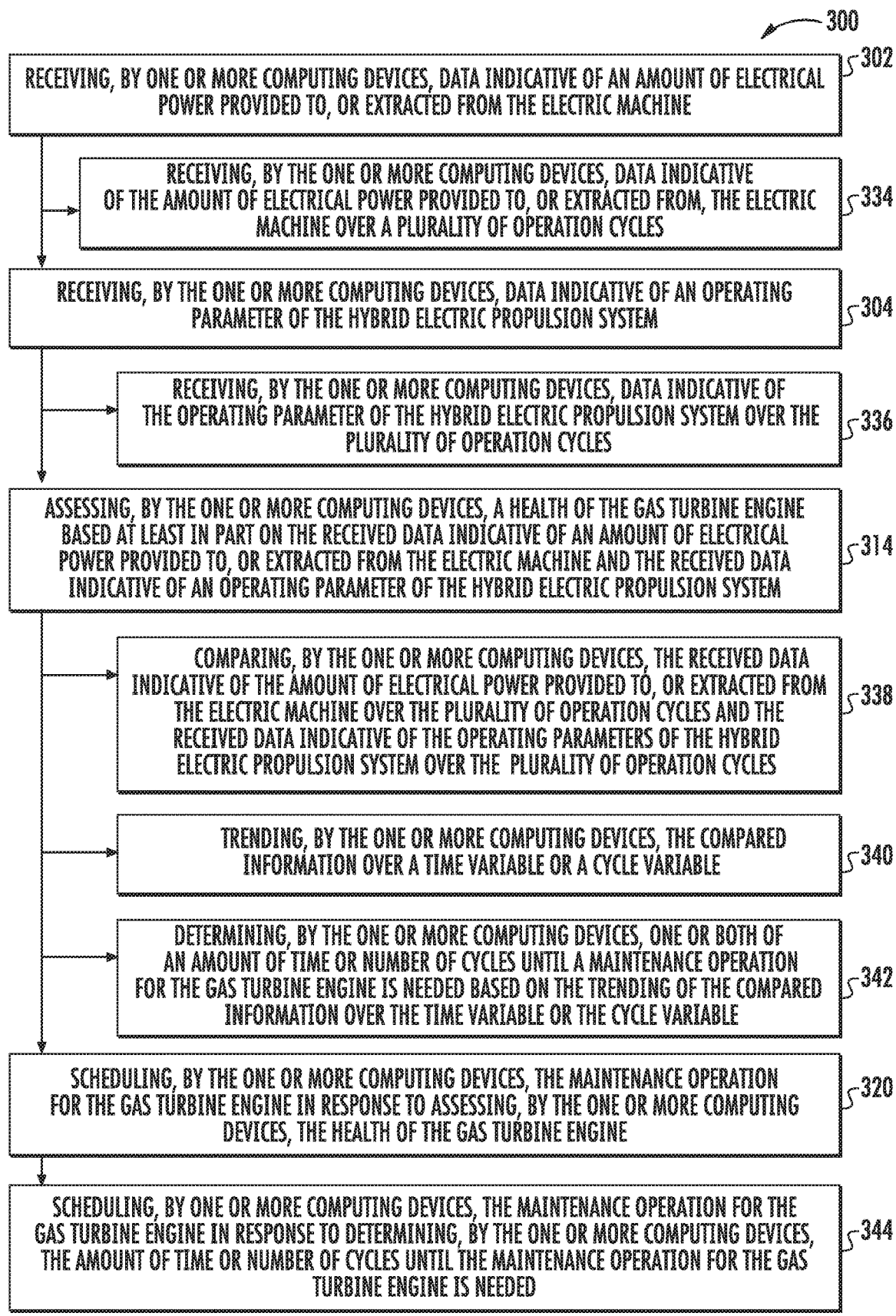
FIG. 7 is a flow diagram of a method of assessing a health of a gas turbine engine of a hybrid electric propulsion system in accordance with yet another exemplary aspect of the present disclosure.

The exemplary method 300 of FIG. 7 may be similar to the exemplary method 300 of FIG. 4. For example, the exemplary aspect of the method 300 depicted in FIG. 7 generally includes at (302) receiving, by one or more computing devices, data indicative of an amount of electrical power provided to, or extracted from the electric machine; at (304) receiving, by the one or more computing devices, data indicative of an operating parameter of the hybrid electric propulsion system; and at (314) assessing, by the one or more computing devices, a health of the gas turbine engine based at least in part on the received data at (302) and the received data at (304).

However, as stated, the exemplary aspect of the method 300 depicted in FIG. 7 is further operable in a predictive manner to, e.g., anticipate necessary maintenance operations. More specifically, for the exemplary aspect of the method 300 depicted in FIG. 7, receiving, by the one or more computing devices, data indicative of the amount of electrical power provided to, or extracted from, the electric machine at (302) includes at (334) receiving, by the one or more computing devices, data indicative of the amount of electrical power provided to, or extracted from, the electric machine over a plurality of operation cycles. The plurality of operation cycles may be a plurality of operation cycles of the gas turbine engine, the hybrid electric propulsion system as a whole, and/or of an aircraft incorporating the hybrid electric propulsion system. In addition, receiving, by the one or more computing devices, data indicative of the operating parameter of the hybrid electric propulsion system at (304) includes at (336) receiving, by the one or more computing devices, data indicative of the operating parameter of the hybrid electric propulsion system over the plurality of operation cycles.

Accordingly, for such an exemplary aspect, assessing, by the one or more computing devices, the health of the gas turbine engine at (314) further includes at (338) comparing, by the one or more computing devices, the received data indicative of the amount of electrical power provided to, or extracted from the electric machine over the plurality of operation cycles at (334) and the received data indicative of the operating parameters of the hybrid electric propulsion system over the plurality of operation cycles at (336). More specifically, for the exemplary aspect of the method 300 depicted in FIG. 7, assessing, by the one or more computing devices, the health of the gas turbine engine at (314) further includes at (340) trending, by the one or more computing devices, the compared information at (338) over a time variable or a cycle variable. In certain exemplary aspects, trending at (340), by the one or more computing devices, the compared information may include plotting a value of the operating parameter for a given amount of electrical power provided to, or extracted from, the electric machine; or in the alternative, plotting, a value of the amount of electrical power provided to, or extracted from, the electric machine for a given value of the operating parameter. In addition, trending at (340), by the one or more computing devices, the compared information may further include assigning or determining a line of best fit for the plotted data points using, e.g., least mean squares, or any other suitable method.

Moreover, referring still to FIG. 7, for the exemplary aspect of the method 300 depicted, assessing, by the one or more computing devices, the health of the gas turbine engine at (314) further includes at (342) determining, by the one or more computing devices, one or both of an amount of time or number of cycles until a maintenance operation for the gas turbine engine is needed based on the trending of the compared information over the time variable or the cycle variable at (340). For example, in certain exemplary aspects, determining, by the one or more computing devices, the amount of time until the maintenance operation for the gas turbine engine is needed at (342) may include extrapolating or extending out the line of best fit determined for the plotted data, and determining when such extrapolated or extended out line of best fit intersects with a threshold for requiring the maintenance operation for the gas turbine engine. In such a manner, the exemplary aspect of the method 300 depicted in FIG. 7 may predict when a maintenance operation for the gas turbine engine will be needed.

Further, for the exemplary aspect of the method 300 depicted in FIG. 7, the method 300 further includes at (320) scheduling, by the one or more computing devices, the maintenance operation for the gas turbine engine in response to assessing, by the one or more computing devices, the health of the gas turbine engine (314), or more specifically, at (344) scheduling, by one or more computing devices, the maintenance operation for the gas turbine engine in response to determining, by the one or more computing devices, the amount of time until the maintenance operation for the gas turbine engine is needed at (342).

Figure 8:
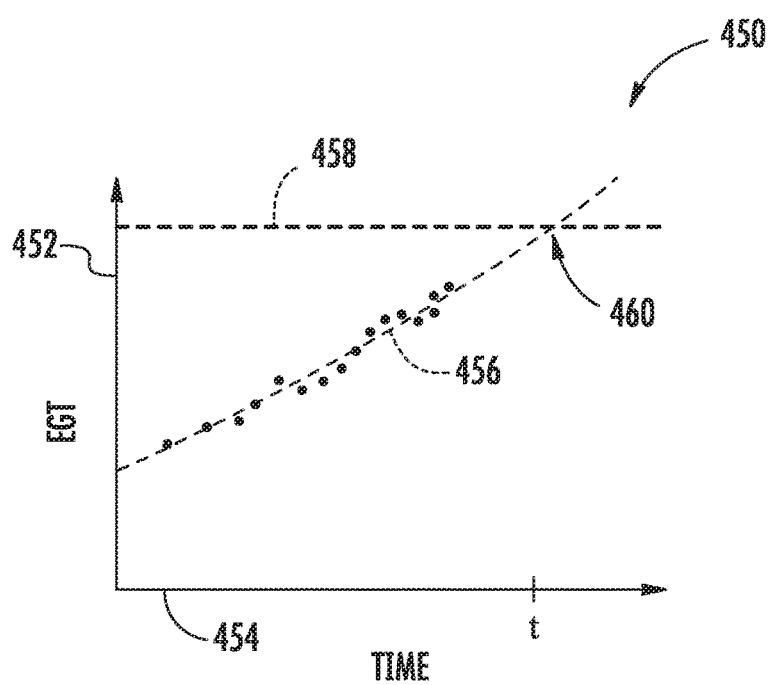
FIG. 8 is a chart depicting one or more exemplary aspects of the exemplary method of FIG. 7.

For example, referring now briefly to FIG. 8, a chart 450 depicting an exemplary aspect of the exemplary method 300 depicted in FIG. 7 is provided. As is shown, the chart 450 generally depicts an operating parameter of the hybrid electric propulsion system (on a Y-axis 452) over of time (on an X-axis 454). More particularly, for the exemplary embodiment of FIG. 8, the chart 450 depicts an exhaust gas temperature as the operating parameter of the hybrid electric propulsion system on the Y-axis 452 over time on the X-axis 454. More particularly, the values of exhaust gas temperature charted are for a particular amount of electrical power provided to, or extracted from, the electric machine. Accordingly, for each of the values of the exhaust gas temperature charted, a constant amount of electrical power was being provided to, or extracted from the electric machine.

As is depicted, the exhaust gas temperature values generally increase over time. The chart 450 further includes a line of best fit 456 for the various exhaust gas temperature values charted. The line of best fit 456 may be determined using a least mean squared method, or any other suitable method. Additionally, a line 458 is depicted in phantom in the chart 450 representing an exhaust gas temperature limit for the particular amount of electrical power being provided to, or extracted from, the electric machine. Once the exhaust gas temperatures reach the exhaust gas temperature limit represented by line 458, the gas turbine engine will be in need of a maintenance operation, such as an engine overhaul. Accordingly, by extending out the line of best fit 456 in a linear manner, an anticipated point 460 at which the exhaust gas temperature values will reach the exhaust gas temperature limit represented by line 458 may be determined. In such a manner, the chart 450 (or similar methodology) may be used to predict a point at which a gas turbine engine will need to undergo a maintenance operation (e.g., the time, t, corresponding to point 460).

It should be appreciated, however, in other exemplary aspects, the operating parameter the hybrid electric propulsion system may be any other suitable operating parameter, and further, instead of time being used on the X-axis 454, the chart 450 may use engine cycles.

Figure 9:
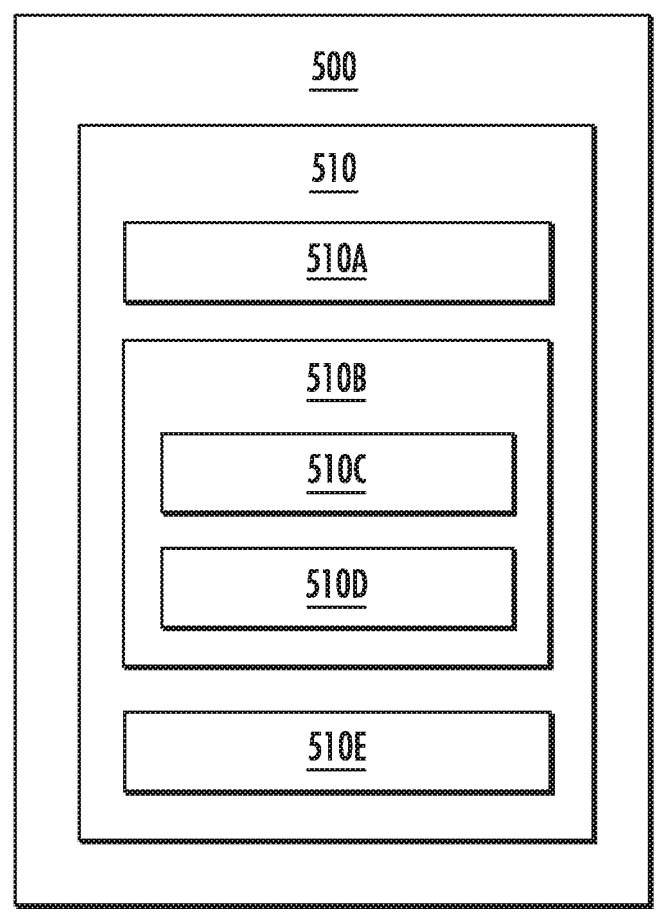
FIG. 9 is a computing system according to example aspects of the present disclosure.

Referring now to FIG. 9, an example computing system 500 according to example embodiments of the present disclosure is depicted. The computing system 500 can be used, for example, as a controller 72 in a hybrid electric propulsion system 50. The computing system 500 can include one or more computing device(s) 510. The computing device(s) 510 can include one or more processor(s) 510A and one or more memory device(s) 510B. The one or more processor(s) 510A can include any suitable processing device, such as a microprocessor, microcontroller, integrated circuit, logic device, and/or other suitable processing device. The one or more memory device(s) 510B can include one or more computer-readable media, including, but not limited to, non-transitory computer-readable media, RAM, ROM, hard drives, flash drives, and/or other memory devices.

The one or more memory device(s) 510B can store information accessible by the one or more processor(s) 510A, including computer-readable instructions 510C that can be executed by the one or more processor(s) 510A. The instructions 510C can be any set of instructions that when executed by the one or more processor(s) 510A, cause the one or more processor(s) 510A to perform operations. In some embodiments, the instructions 510C can be executed by the one or more processor(s) 510A to cause the one or more processor(s) 510A to perform operations, such as any of the operations and functions for which the computing system 500 and/or the computing device(s) 510 are configured, the operations for assessing a health of a gas turbine engine of a hybrid electric propulsion system for an aircraft (e.g, method 300), as described herein, and/or any other operations or functions of the one or more computing device(s) 510. In such a manner, the exemplary computing system 500 may be configured as an engine health assessment control system.

The instructions 510C can be software written in any suitable programming language or can be implemented in hardware. Additionally, and/or alternatively, the instructions 510C can be executed in logically and/or virtually separate threads on processor(s) 510A. The memory device(s) 510B can further store data 510D that can be accessed by the processor(s) 510A. For example, the data 510D can include data indicative of operational parameters of the aircraft and/or the hybrid electric propulsion system, data indicative of performance maps for the aircraft and/or the hybrid electric propulsion system, any user input, such as flight phase data, and/or any other data and/or information described herein.

The computing device(s) 510 can also include a network interface 510E used to communicate, for example, with the other components of system 500 (e.g., via a network). The network interface 510E can include any suitable components for interfacing with one or more network(s), including for example, transmitters, receivers, ports, controllers, antennas, and/or other suitable components. One or more external display devices (not depicted) can be configured to receive one or more commands from the computing device(s) 510.

The technology discussed herein makes reference to computer-based systems and actions taken by and information sent to and from computer-based systems. One of ordinary skill in the art will recognize that the inherent flexibility of computer-based systems allows for a great variety of possible configurations, combinations, and divisions of tasks and functionality between and among components. For instance, processes discussed herein can be implemented using a single computing device or multiple computing devices working in combination. Databases, memory, instructions, and applications can be implemented on a single system or distributed across multiple systems. Distributed components can operate sequentially or in parallel.

Although specific features of various embodiments may be shown in some drawings and not in others, this is for convenience only. In accordance with the principles of the present disclosure, any feature of a drawing may be referenced and/or claimed in combination with any feature of any other drawing.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A computer-implemented method of assessing a health of a gas turbine engine of a hybrid-electric propulsion system for an aircraft, the hybrid-electric propulsion system comprising an electric machine rotatable with the gas turbine engine, the method comprising:

receiving, by one or more computing devices, data indicative of an amount of electrical power provided to, or extracted from, the electric machine;

receiving, by the one or more computing devices, data indicative of an operating parameter of the hybrid-electric propulsion system;

assessing, by the one or more computing devices, a health of the gas turbine engine based at least in part on the received data indicative of the amount of electrical power provided to, or extracted from, the electric machine and the received data indicative of the operating parameter of the hybrid electric propulsion system;

providing, by the one or more computing devices, information to a user indicative of the health of the gas turbine engine;

changing, by the one or more computing devices, an amount of fuel provided to a combustion section of the gas turbine engine for an amount of time, the combustion section including a sensor operable with a fuel delivery system; and determining, by the one or more computing devices, a change in the amount of electrical power provided to, or extracted from, the electric machine during at least a portion of the time that the amount of fuel is changed, wherein receiving, by the one or more computing devices, data indicative of the amount of electrical power provided to, or extracted from, the electric machine comprises receiving, by the one or more computing devices, data indicative of the change in the amount of electrical power provided to, or extracted from, the electric machine during at least a portion of the amount of time the amount of fuel is changed.

2. The method of claim 1, wherein receiving, by the one or more computing devices, data indicative of the operating parameter of the hybrid electric propulsion system comprises receiving, by the one or more computing devices, data indicative of an operating parameter of the gas turbine engine.

3. The method of claim 2, wherein receiving, by the one or more computing devices, data indicative of the operating parameter of the gas turbine engine comprises receiving, by the one or more computing devices, data indicative of one or more of a temperature within the gas turbine engine, a rotational speed of one or more components of the gas turbine engine, an amount of fuel provided to the combustion section of the gas turbine engine, or data indicative of a pressure within the gas turbine engine.

4. The method of claim 2, wherein receiving, by the one or more computing devices, data indicative of the amount of electrical power provided to, or extracted from, the electric machine comprises receiving, by the one or more computing devices, data indicative of the amount of electrical power extracted from the electric machine.

5. The method of claim 2, wherein receiving, by the one or more computing devices, data indicative of the amount of electrical power provided to, or extracted from, the electric machine comprises receiving, by the one or more computing devices, data indicative of the amount of electrical power provided to the electric machine.

6. The method of claim 1, wherein receiving, by the one or more computing devices, data indicative of the operating parameter of the hybrid-electric propulsion system comprises receiving, by the one or more computing devices, data indicative of a change in a fuel flow parameter during the amount of time.

7. The method of claim 1, wherein receiving, by the one or more computing devices, data indicative of the amount of electrical power provided to, or extracted from, the electric machine comprises receiving, by the one or more computing devices, data indicative of the amount of electrical power provided to, or extracted from, the electric machine over a plurality of operation cycles, wherein receiving, by the one or more computing devices, data indicative of the operating parameter of the hybrid-electric propulsion system comprises receiving, by the one or more computing devices, data indicative of the operating parameter of the hybrid-electric propulsion system over the plurality of operation cycles, and wherein assessing, by the one or more computing devices, the health of the gas turbine engine comprises comparing, by the one or more computing devices, the received data indicative of the amount of electrical power provided to, or extracted from, the electric machine over the plurality of operation cycles and the received data indicative of the operating parameter of the hybrid-electric propulsion system over the plurality of operation cycles.

8. The method of claim 7, wherein assessing, by the one or more computing devices, the health of the gas turbine engine further comprises trending, by the one or more computing devices, the compared information over a time variable or a cycle variable.

9. The method of claim 8, wherein assessing, by the one or more computing devices, the health of the gas turbine engine further comprises determining, by the one or more computing devices, an amount of time, a number of cycles, or both until a maintenance operation is needed for the gas turbine engine based on the trending of the compared information over the time variable or the cycle variable.

10. The method of claim 1, further comprising:
modifying, by the one or more computing devices, an engine parameter indicative of a stall margin of the gas turbine engine in response to the assessment, by the one or more computing devices, of the health of the gas turbine.

11. The method of claim 1, wherein providing, by the one or more computing devices, information to the user indicative of the health of the gas turbine engine comprises displaying, by the one or more computing devices, the health of the gas turbine engine on a user interface device.

12. The method of claim 1, further comprising:
scheduling, by the one or more computing devices, a maintenance operation for the gas turbine engine in response to assessing, by the one or more computing devices, the health of the gas turbine engine.

13. A hybrid-electric propulsion system for an aircraft comprising:
an electric machine;
a gas turbine engine mechanically coupled to the electric machine for driving the electric machine;
an electric propulsor assembly electrically connectable to the electric machine; and
a controller comprising memory and one or more processors, the memory storing instructions that when executed by the one or more processors cause the hybrid-electric propulsion system to perform functions, the functions including:
receiving data indicative of an amount of electrical power provided to, or extracted from, the electric machine;
receiving data indicative of an operating parameter of the hybrid-electric propulsion system;
assessing a health of the gas turbine engine based at least in part on the received data indicative of the amount of electrical power provided to, or extracted from, the electric machine and the received data indicative of the operating parameter of the hybrid electric propulsion system;
providing information to a user indicative of the health of the gas turbine engine;
changing an amount of fuel provided to a combustion section of the gas turbine engine for an amount of time, the combustion section including a sensor operable with a fuel delivery system; and
determining a change in the amount of electrical power provided to, or extracted from, the electric machine during at least a portion of the time that the amount of fuel is changed, wherein receiving data indicative of the amount of electrical power provided to, or extracted from, the electric machine comprises receiving data indicative of the change in the amount of electrical power provided to, or extracted from, the electric machine during at least a portion of the amount of time the amount of fuel is changed.

14. The hybrid-electric propulsion system of claim 13, wherein receiving data indicative of the operating parameter of the hybrid electric propulsion system comprises receiving data indicative of an operating parameter of the gas turbine engine.

15. The hybrid-electric propulsion system of claim 14, wherein receiving data indicative of the operating parameter of the gas turbine engine comprises receiving data indicative of one or more of a temperature within the gas turbine engine, a rotational speed of one or more components of the gas turbine engine, an amount of fuel provided to the combustion section of the gas turbine engine, or data indicative of a pressure within the gas turbine engine.

16. The hybrid-electric propulsion system of claim 13, wherein receiving data indicative of the operating parameter of the hybrid-electric propulsion system comprises receiving data indicative of a change in a fuel flow parameter during the amount of time.

17. The hybrid-electric propulsion system of claim 13, wherein receiving data indicative of the amount of electrical power provided to, or extracted from, the electric machine comprises receiving data indicative of the amount of electrical power provided to, or extracted from, the electric machine over a plurality of operation cycles, wherein receiving data indicative of the operating parameter of the hybrid-electric propulsion system comprises receiving data indicative of the operating parameter of the hybrid-electric propulsion system over the plurality of operation cycles, and wherein assessing the health of the gas turbine engine comprises comparing the received data indicative of the amount of electrical power provided to, or extracted from, the electric machine over the plurality of operation cycles and the received data indicative of the operating parameter of the hybrid-electric propulsion system over the plurality of operation cycles.

18. An engine health assessment control system for a hybrid electric propulsion system having a gas turbine engine, the control system comprising one or more controllers comprising memory and one or more processors, the memory storing instructions that when executed by the one or more processors cause the engine health assessment control system to perform functions, the functions including:
  receiving data indicative of an amount of electrical power provided to, or extracted from, the electric machine;
  receiving data indicative of an operating parameter of the hybrid-electric propulsion system;
  assessing a health of the gas turbine engine based at least in part on the received data indicative of the amount of electrical power provided to, or extracted from, the electric machine and the received data indicative of the operating parameter of the hybrid electric propulsion system;
  providing information to a user indicative of the health of the gas turbine engine;
  changing an amount of fuel provided to a combustion section of the gas turbine engine for an amount of time, the combustion section including a sensor operable with a fuel delivery system; and
  determining a change in the amount of electrical power provided to, or extracted from, the electric machine during at least a portion of the time that the amount of fuel is changed, wherein receiving data indicative of the amount of electrical power provided to, or extracted from, the electric machine comprises receiving data indicative of the change in the amount of electrical power provided to, or extracted from, the electric machine during at least a portion of the amount of time the amount of fuel is changed.

19. The method of claim 1, wherein the hybrid-electric propulsion system further comprises:
  a first propulsor assembly including the electric machine;
  a second propulsor assembly including an electric propulsor assembly; and
  an electric energy storage unit,
  wherein the electric propulsor assembly, the electric energy storage unit, and the electric machine are each electrically connectable through one or more electric lines of a power bus.

20. The hybrid-electric propulsion system of claim 13, further comprising:
  a first propulsor assembly including the electric machine;
  a second propulsor assembly including the electric propulsor assembly; and
  an electric energy storage unit,
  wherein the electric propulsor assembly, the electric energy storage unit, and the electric machine are each electrically connectable through one or more electric lines of a power bus.

* * * * *